United States Patent
Araki et al.

(10) Patent No.: US 11,042,358 B2
(45) Date of Patent: Jun. 22, 2021

(54) SECURE COMPUTATION SYSTEM, SECURE COMPUTATION METHOD, SECURE COMPUTATION APPARATUS, DISTRIBUTION INFORMATION GENERATION APPARATUS, AND METHODS AND PROGRAMS THEREFOR

(71) Applicant: NEC Corporation, Tokyo (JP)

(72) Inventors: Toshinori Araki, Tokyo (JP); Jun Furukawa, Tokyo (JP); Kazuma Ohara, Tokyo (JP); Haruna Higo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 139 days.

(21) Appl. No.: 16/325,775

(22) PCT Filed: Jul. 6, 2017

(86) PCT No.: PCT/JP2017/024873
§ 371 (c)(1),
(2) Date: Feb. 15, 2019

(87) PCT Pub. No.: WO2018/034079
PCT Pub. Date: Feb. 22, 2018

(65) Prior Publication Data
US 2019/0212986 A1 Jul. 11, 2019

(30) Foreign Application Priority Data
Aug. 18, 2016 (JP) .............................. JP2016-160383

(51) Int. Cl.
*G06F 7/48* (2006.01)
*H04L 9/08* (2006.01)
*G09C 1/00* (2006.01)

(52) U.S. Cl.
CPC ............. *G06F 7/4824* (2013.01); *G09C 1/00* (2013.01); *H04L 9/085* (2013.01); *H04L 2209/46* (2013.01)

(58) Field of Classification Search
CPC ......... G06F 7/4824; G06F 7/544; G09C 1/00; H04L 9/085; H04L 2209/46
See application file for complete search history.

(56) References Cited

U.S. PATENT DOCUMENTS 7,421,080 B2 * 9/2008 Matsumura ............. H04L 9/085
380/277
9,064,123 B2 * 6/2015 Ikarashi ................ G06F 21/602
(Continued)

OTHER PUBLICATIONS

Bogdanov et al. "High-performance secure multi-party computation for data mining applications". Retrieved on [Sep. 11, 2020]. Retrieved from the Internet <https://research.cyber.ee/~janwil/publ/newprotocols-ijis-revision-2016.pdf> (Year: 2016).*

(Continued)

*Primary Examiner* — Aimee Li
*Assistant Examiner* — Carlo Waje
(74) *Attorney, Agent, or Firm* — Sughrue Mion, PLLC

(57) ABSTRACT

A secure computation system is provided. The system includes a distribution information generation apparatus that generates data distribution values, sign distribution values and carry distribution values from at least two fixed-point numbers by distributing each of the at least two fixed-point numbers using an additive secret sharing scheme; and a secure computation apparatus group including at least two secure computation apparatuses. The secure computation apparatus group includes: a secure digit extender; and a secure multiplier.

20 Claims, 10 Drawing Sheets

(56) References Cited

U.S. PATENT DOCUMENTS

| | | | | |
|---|---|---|---|---|
| 10,657,847 | B2* | 5/2020 | Hamada | G06F 7/586 |
| 10,748,454 | B2* | 8/2020 | Ikarashi | H04L 9/12 |
| 10,749,671 | B2* | 8/2020 | Teranishi | H04L 9/085 |
| 10,867,018 | B2* | 12/2020 | Ikarashi | G06F 21/64 |
| 2010/0287366 | A1* | 11/2010 | Araki | H04L 9/3026 713/150 |
| 2013/0182836 | A1* | 7/2013 | Hamada | H04L 9/085 380/28 |
| 2015/0278547 | A1* | 10/2015 | Kawamoto | G06F 21/6272 726/26 |
| 2016/0218862 | A1* | 7/2016 | Ikarashi | G09C 1/00 |
| 2018/0225431 | A1* | 8/2018 | Ikarashi | G06F 21/64 |
| 2019/0229904 | A1* | 7/2019 | Hamada | G06F 17/18 |
| 2019/0266326 | A1* | 8/2019 | Furukawa | G06F 21/64 |
| 2019/0369959 | A1* | 12/2019 | Veeningen | H04L 9/32 |
| 2020/0287711 | A1* | 9/2020 | Araki | G06F 7/723 |

OTHER PUBLICATIONS

Launchbury et al. "Application-Scale Secure Multiparty Computation". Retrieved on [Sep. 10, 2020]. Retrieved from the Internet <https://web.archive.org/web/20150919130857/https://galois.com/wp-content/uploads/2014/08/pub_JL-DWA-TD-EM_ApplicationScaleSecureMPC.pdf> (Year: 2015).*

O. Catrina and C. Dragulin, "Multiparty Computation of Fixed-Point Multiplication and Reciprocal," 2009 20th International Workshop on Database and Expert Systems Application, Linz, 2009, pp. 107-111, doi: 10.1109/DEXA.2009.84. (Year: 2009).*

N. Maheshwari and K. Kiyawat, "Structural Framing of Protocol for Secure Multiparty Cloud Computation," 2011 Fifth Asia Modelling Symposium, Kuala Lumpur, 2011, pp. 187-192, doi: 10.1109/AMS.2011.42. (Year: 2011).*

Riazi et al. "Chameleon: A Hybrid Secure Computation Framework for Machine Learning Applications". Retrieved on [Sep. 10, 2020]. Retrieved from the Internet <https://arxiv.org/pdf/1801.03239.pdf> (Year: 2018).*

Ohara "Efficient Constructions and Implementations for Secure Multi-Party Computation". Retrieved on [Sep. 10, 2020]. Retrieved from the Internet <https://uec.repo.nii.ac.jp/?action=repository_action_common_download&item_id=9395&item_no=1&attribute_id=20&file_no=1> (Year: 2019).*

Shamir, "How to Share a Secret", Communications of the ACM, Nov. 1979, pp. 612-613, vol. 22, No. 11 (2 pages total).

Ben-Or, et al., "Completeness Theorems for Non-Cryptographic Fault-Tolerant Distributed Computation (Extended Abstract)", Proceedings of the 20th Annual ACM Symposium on Theory of Computing, 1988 (10 pages total).

Gennaro, et al., "Simplified VSS and Fast-track Multiparty Computations with Applications to Threshold Cryptography", PODC, 1998 (11 page total).

Catrina, et al., "Secure Computation with Fixed-Point Numbers", Dept. of Computer Science, University of Mannheim, Germany, 2010, pp. 35-50 (16 pages total).

Damgard, et al., "Unconditionally Secure Constant-Rounds Multi-Party Computation for Equality, Comparison, Bits and Exponentiation", Dept. of Computer Science, University of Aarhus, Denmark (20 pages total).

Beaver, "Efficient Multiparty Protocols Using Circuit Randomization", CRYPTO '91, LNCS 576, 1992 pp. 420-432 (13 pages total).

Krips, et al., "Hybrid Model of Fixed and Floating Point Numbers in Secure Multiparty Computations", Dec. 23, 2014, pp. 1-24 URL:https://eprint.iacr.org/2014/221/20141223:154329 (25 pages total).

Kamm, et al., "Secure floating point arithmetic and private satellite collision analysis", pp. 1-34, URL:https://eprint.iacr.org/2013/850/20131217:154023 (35 pages total).

Amada, et al., "Himitsu Keisan o Mochiita Hifuchi Gyoretsu Inshi Bunkai no Koritsuteki na Jitsugen ni Kansuru Ichi Kosatsu", Computer Security Symposium 2016 Ronbunshu, Oct. 4, 2016, pp. 1056-1063 (9 pages total).

International Preliminary Report on Patentability with a Translation of Written Opinion issued from the International Bureau in counterpart International Application No. PCT/JP2017/024873, dated Feb. 19, 2019.

International Search Report, issued by International Searching Authority in corresponding International Application No. PCT/JP2017/024873, dated Oct. 3, 2017.

* cited by examiner

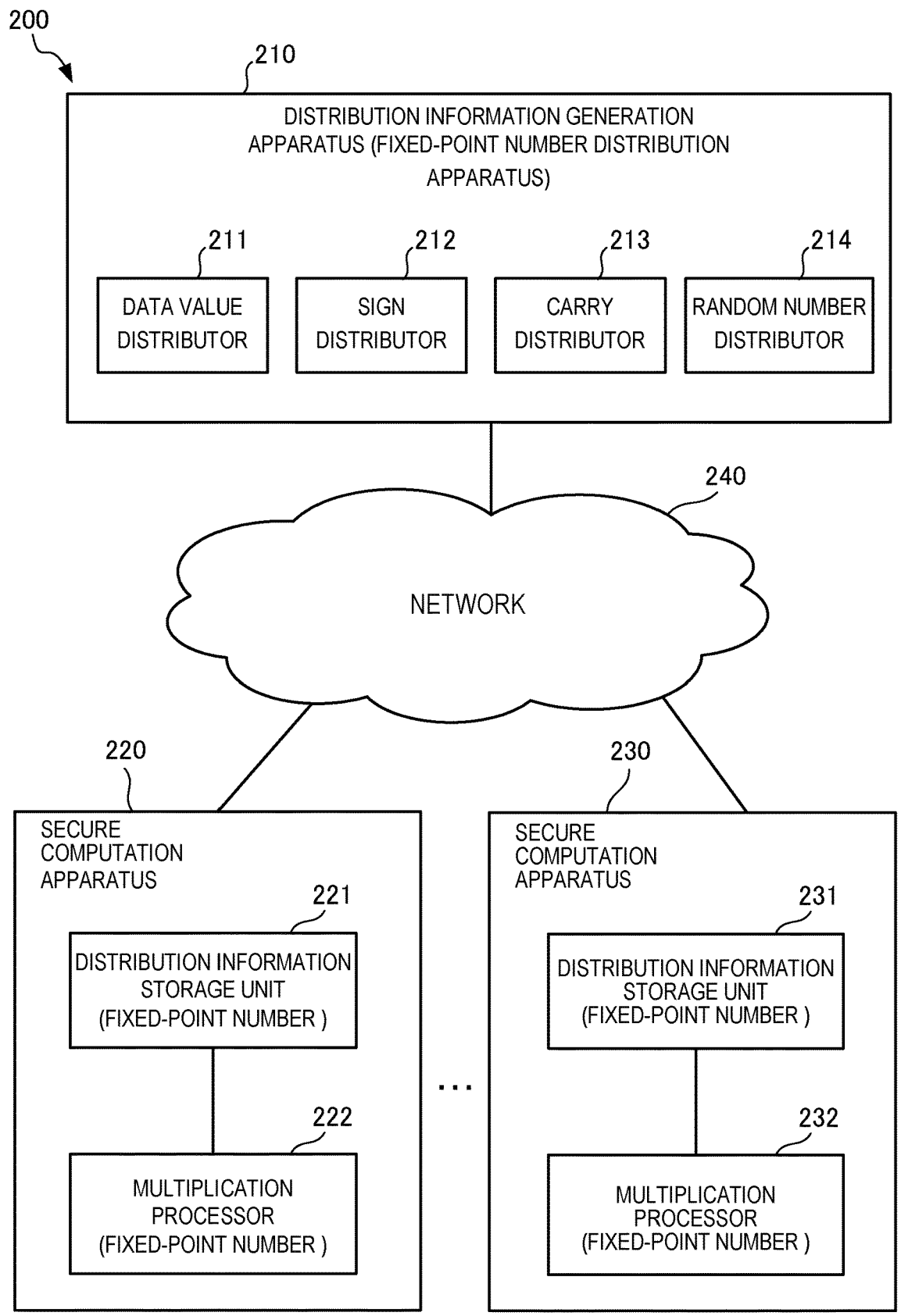
F I G. 2

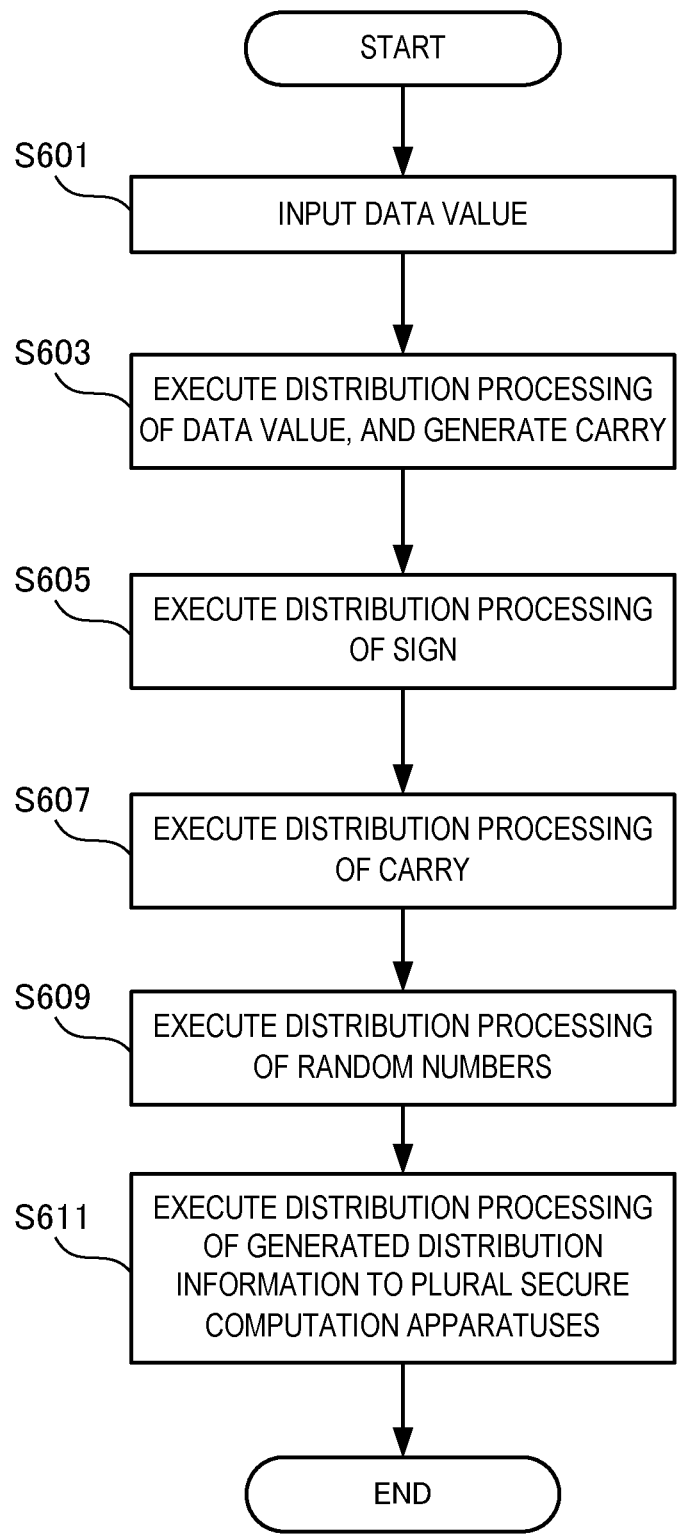
F I G. 6

US 11,042,358 B2

SECURE COMPUTATION SYSTEM, SECURE COMPUTATION METHOD, SECURE COMPUTATION APPARATUS, DISTRIBUTION INFORMATION GENERATION APPARATUS, AND METHODS AND PROGRAMS THEREFOR

CROSS REFERENCE TO RELATED APPLICATIONS

This application is a National Stage Entry of PCT/JP2017/024873 filed on Jul. 6, 2017, which claims priority from Japanese Patent Application 2016-160383 filed on Aug. 18, 2016, the contents of all of which are incorporated herein by reference, in their entirety.

TECHNICAL FIELD

The present invention relates to a secure computation system, a secure computation method, a secure computation apparatus, a distribution information generation apparatus, and methods and programs therefor.

BACKGROUND ART

A secure computation scheme is a technique capable of concealing a computation process and a result for a related subject. By distributing data to a plurality of servers managed by the third party like a cloud and saving the data, it is possible to execute various operations for the data. Since the third party never knows the data, a computation process, and a computation result, this technique can be used to outsource analysis processing for sensitive information such as personal information. As the secure computation scheme, there is known a method of basic processing for executing arbitrary computation, and it is possible to execute arbitrary computation.

In the above technical field, a method (described in non-patent literatures 2 and 3 and the like) assuming that data is distributed using the Shamir (k, n) scheme is representative. Non-patent literature 2 describes a secure computation scheme for executing addition/subtraction and multiplication, in which multiplication requires two rounds of communication. Non-patent literature 3 proposes a method in which multiplication can be executed only in one round of communication.

Non-patent literature 4 discloses a distribution protocol TrancPr ([a], k, m) for right-shifting a k-digit distributed number [a] by m bits, and a multiplication protocol FPMul ([a], [b], k, f) for performing secure multiplication of k-digit numbers [a] and [b] each having a f-bit fractional part using the distribution protocol TrancPr ([a], k, m). The computation procedure of FPMul ([a], [b], k, f) is represented by (1) [c]←[a]*[b], and (2) [d]←TrancPr([c], 2k, f). For the procedure of the distribution protocol TrancPr ([a], k, m), an algorism of distributing random 0 or 1, a protocol PRandBit ( ) for sharing random 1-bit information among participants, and a protocol PRandInt ( ) for sharing a designated x-bit length random number among participants are used.

CITATION LIST

Non-Patent Literature

Non-patent literature 1: Adi Shamir, "How to Share a Secret", Commun. ACM 22 (11), pp. 612-613, 1979.

Non-patent literature 2: Michael Ben-Or, Shafi Goldwasser, Avi Wigderson, "Completeness Theorems for Non-Cryptographic Fault-Tolerant Distributed Computation (Extended Abstract)", Proceedings of the 20th Annual ACM Symposium on Theory of Computing, 1988.

Non-patent literature 3: Rosario Gennaro, Michael O. Rabin, Tal Rabin, "Simplified VSS and Fast-track multiparty Computations with Applications to Threshold Cryptography", PODC 1998: pp. 101-111

Non-patent literature 4: Octavian Catrina and Amitabh Saxena, "Secure Computation With Fixed-Point Numbers", Financial Cryptography 2010: pp. 35-50

Non-patent literature 5: Ivan Dangard, Matthias Fitzi, Eike Kilts, Jesper Buus Nielsen, Tomas Toft, "Unconditionally Secure Constant-Rounds Multi-party Computation for Equality, Comparison, Bits and Exponentiation", TCC 2006: pp. 285-304

Non-patent literature 6: Donald Beaver, "Efficient Multi-party Protocols Using Circuit Randomization", CRYPTO '91, LNCS 576, pp. 420-432, 1992.

SUMMARY OF THE INVENTION

Technical Problem

In the technique described in the above non-patent literature 4, however, a communication amount is very large. For example, since PRandBit ( ) and PRandInt ( ) are independent of input values, they can be executed at a stage before multiplication is executed but PRandBit ( ) requires a large amount of communication. With reference to non-patent literature 5, even if the (2, 3) threshold scheme is used, several hundred-bit communication is required per bit. That is, for one multiplication operation associated with an m-bit fixed-point number, (several hundred*m)-bit communication is required for preprocessing. A method that suppresses an overall communication amount including such preprocessing is desirable.

The present invention enables to provide a technique of solving the above-described problem.

Solution to Problem

One example aspect of the present invention provides a secure computation system comprising:
a distribution information generation apparatus that generates, from at least two fixed-point numbers, data distribution values, sign distribution values and carry distribution values by distributing each of the at least two fixed-point numbers using an additive secret sharing scheme; and
a secure computation apparatus group including at least two secure computation apparatuses,
wherein the secure computation apparatus group comprises:
a secure digit extender that generates at least two extended fixed-point numbers formed from extended data distribution values, extended sign distribution values and extended carry distribution values, all of which are obtained by extending digit numbers using the data distribution values, the sign distribution values and the carry distribution values of the at least two fixed-point numbers while protecting a security; and
a secure multiplier that generates extended data distribution values, extended sign distribution values and extended carry distribution values of an extended multiplication result of multiplying a first extended fixed-point number and a second extended fixed-point number that are generated by said secure digit extender while protecting a security, and adjusts digit numbers of the extended data distribution values of the extended multiplication result to make distribution values of a secure multiplication result.

Another example aspect of the present invention provides a secure computation method for a secure computation system, comprising:

generating, from at least two fixed-point numbers, data distribution values, sign distribution values, and carry distribution values by distributing each of the at least two fixed-point number using an additive secret sharing scheme;

generating at least two extended fixed-point numbers formed from extended data distribution values, extended sign distribution values and extended carry distribution values, all of which are obtained by extending digit numbers using the data distribution values, the sign distribution values and the carry distribution values of each fixed-point number while protecting a security; and generating extended data distribution values, extended sign distribution values and extended carry distribution values of an extended multiplication result of multiplying a first extended fixed-point number and a second extended fixed-point number that are generated in the extending digit numbers while protecting a security, and adjusting the digit numbers of the extended data distribution values of the extended multiplication result to make distribution values of a secure multiplication result.

Still other example aspect of the present invention provides a distribution information generation apparatus comprising:

a data value distributor that distributes data values of at least two fixed-point numbers using an additive secret sharing scheme for secure multiplication;

a sign distributor that distributes sign values of the at least two fixed-point numbers using the additive secret sharing scheme for the secure multiplication; and a carry distributor that distributes, using the additive secret sharing scheme for the secure multiplication, carry values occurring when distributing the data values of the at least two fixed-point numbers using the additive secret sharing scheme.

Still other example aspect of the present invention provides a distribution information generation method comprising:

distributing data values of at least two fixed-point numbers using an additive secret sharing scheme for secure multiplication;

distributing sign values of the at least two fixed-point numbers using the additive secret sharing scheme for the secure multiplication; and distributing, using the additive secret sharing scheme for the secure multiplication, carry values occurring when distributing the data values of the at least two fixed-point numbers using the additive secret sharing scheme.

Still other example aspect of the present invention provides a distribution information generation program for causing a computer to execute a method, comprising:

distributing data values of at least two fixed-point numbers using an additive secret sharing scheme for secure multiplication;

distributing sign values of the at least two fixed-point numbers using the additive secret sharing scheme for the secure multiplication; and distributing, using the additive secret sharing scheme for the secure multiplication, carry values occurring when distributing the data values of the at least two fixed-point numbers using the additive secret sharing scheme.

Still other example aspect of the present invention provides a secure computation apparatus comprising:

a secure digit extender that generates at least two extended fixed-point numbers formed from extended data distribution values, extended sign distribution values, and extended carry distribution values, all of which are obtained by extending digit numbers using data distribution values, sign distribution values and carry distribution values of at least two fixed-point numbers and with referring while protecting a security extended data distribution values and extended carry distribution values generated from counterpart of distribution values the at least two fixed-point number; and a secure multiplier that generates extended data distribution values, extended sign distribution values and extended carry distribution values of an extended multiplication result of multiplying a first extended fixed-point number and a second extended fixed-point number with referring while protecting a security extended data distribution values and extended carry distribution values generated from counterpart of distribution values of at least two extended fixed-point numbers, and adjusts the digit numbers of the extended data distribution values of the extended multiplication result to make distribution values of a secure multiplication result.

Still other example aspect of the present invention provides a secure computation method for a secure computation apparatus, comprising:

generating at least two extended fixed-point numbers formed from extended data distribution values, extended sign distribution values, and extended carry distribution values, all of which are obtained by extending digit numbers using data distribution values, sign distribution values and carry distribution values of at least two fixed-point numbers and with referring while protecting a security extended data distribution values and extended carry distribution values generated from counterpart of distribution values the at least two fixed-point number; and generating extended data distribution values, extended sign distribution values and extended carry distribution values of an extended multiplication result of multiplying a first extended fixed-point number and a second extended fixed-point number with referring while protecting a security extended data distribution values and extended carry distribution values generated from counterpart of distribution values of at least two extended fixed-point number, and adjusting the digit numbers of the extended data distribution values of the extended multiplication result to make distribution values of a secure multiplication result.

Still other example aspect of the present invention provides a secure computation program for causing a computer to execute a method, comprising:

generating at least two extended fixed-point numbers formed from extended data distribution values, extended sign distribution values, and extended carry distribution values, all of which are obtained by extending digit numbers using data distribution values, sign distribution values and carry distribution values of at least two fixed-point numbers and with referring while protecting a security extended data distribution values and extended carry distribution values generated from counterpart of distribution values the at least two fixed-point number; and generating extended data distribution values, extended sign distribution values and extended carry distribution values of an extended multiplication result of multiplying a first extended fixed-point number and a second extended fixed-point number with referring while protecting a security extended data distribution values and extended carry distribution values generated from counterpart of distribution values of at least two extended fixed-point numbers, and adjusting the digit numbers of the extended data distribution values of the extended multiplication result to make distribution values of a secure multiplication result.

Advantageous Effects of Invention

According to the present invention, it is possible to execute secure multiplication, in which a computed value, a computation result, and a value during computation cannot be known, while suppressing an overall communication amount.

BRIEF DESCRIPTION OF DRAWINGS

FIG. 2 is a block diagram showing the arrangement of a secure computation system according to the second example embodiment of the present invention;

FIG. 6 is a flowchart illustrating the procedure of distribution information generation processing of the distribution information generation apparatus according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A secure computation system 100 according to the first example embodiment of the present invention will be described with reference to FIG. 1. The secure computation system 100 is a system that performs secure computation of fixed-point numbers using distribution information while protecting a security.

Figure 1:
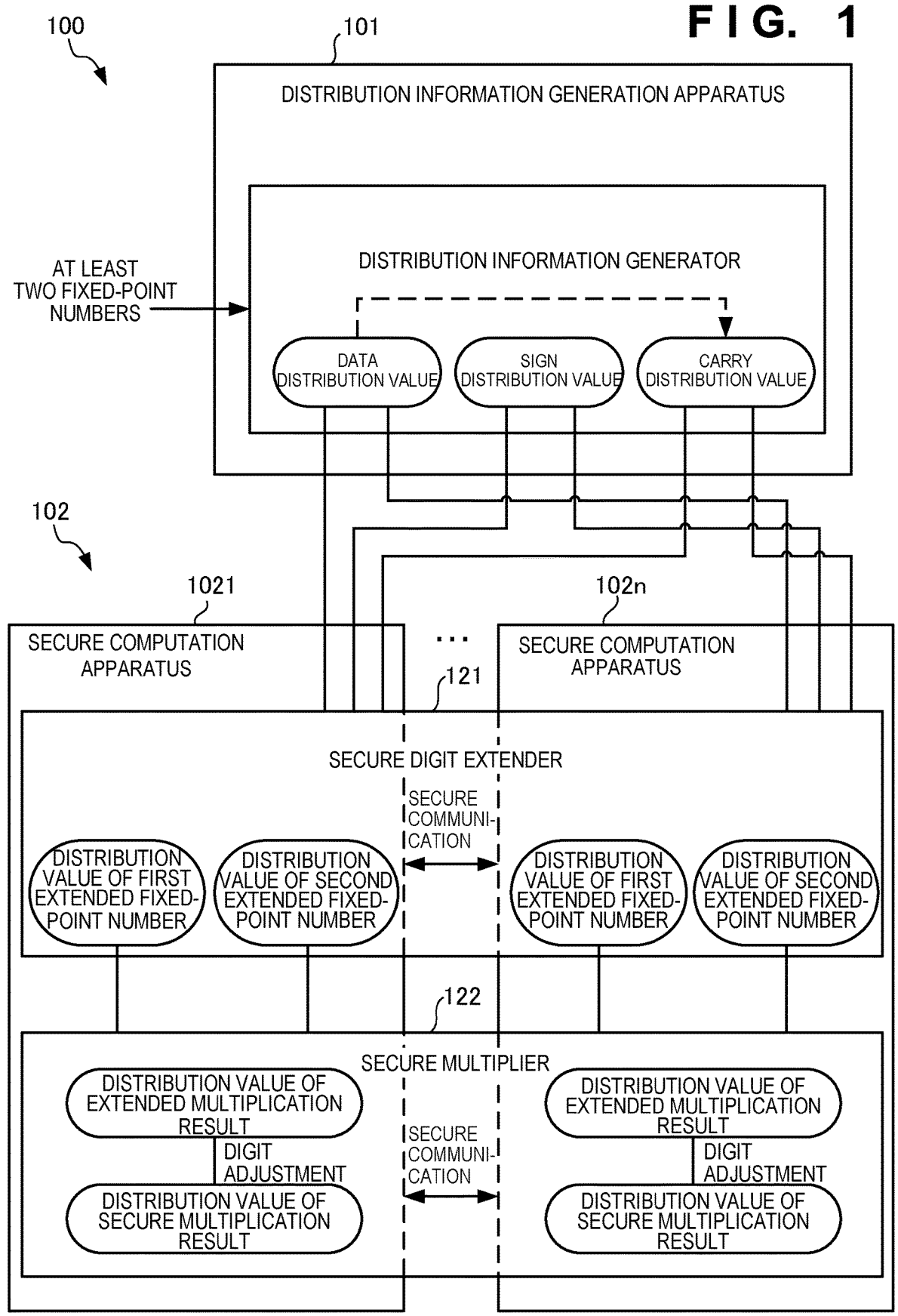
FIG. 1 is a block diagram showing the arrangement of a secure computation system according to the first example embodiment of the present invention.

As shown in FIG. 1, the secure computation system 100 includes a distribution information generation apparatus 101, and a secure computation apparatus group 102 including at least two secure computation apparatuses 1021 to 102n. The distribution information generation apparatus 101 generates, from at least two fix-point numbers, data distribution values, sign distribution values, and carry distribution values by distributing each fixed-point number using an additive secret sharing scheme. The secure computation apparatus group 102 includes a secure digit extender 121 and a secure multiplier 122.

Using the data distribution values, sign distribution values, and carry distribution values of each fixed-point number, the secure digit extender 121 generates each distributed extended fixed-point number formed from extended data distribution values, extended sign distribution values, and extended carry distribution values, all of which are obtained by extending digit numbers, while protecting a security. The secure multiplier 122 generates extended data distribution values, extended sign distribution values, and extended carry distribution values of an extended multiplication result of multiplying distributed first extended fixed-point number and second extended fixed-point number while protecting a security, and adjusts the digit numbers of the extended data distribution values of the extended multiplication result to make distribution values of the secure multiplication result.

According to this example embodiment, the data distribution values, sign distribution values, and carry distribution values of each fixed-point number are generated and secure multiplication of the data distribution values and secure multiplication of the carry distribution values are made independent of each other. Therefore, it is possible to execute secure multiplication, in which a computed value, a computation result, and a value during computation cannot be known, while suppressing an overall communication amount.

Second Example Embodiment

A secure computation system according to the second example embodiment of the present invention will be described next. The secure computation system according to this example embodiment includes a distribution information generation apparatus that generates distribution information by distributing a fixed-point number, and a secure computation apparatus group formed from at least two secure computation apparatuses each of which performs secure computation of a fixed-point number using the distribution information while protecting a security. These apparatuses are connected via a network.

The distribution information generation apparatus generates, from at least two fixed-point numbers, data distribution values, sign distribution values, and carry distribution values by distributing each fixed-point number using an additive secret sharing scheme. In this example embodiment, an additive (2, 2) scheme usable by a secret sharing scheme is used as the additive secret sharing scheme. However, another additive (k, n) scheme or a secure computation scheme based on an additive (k, n) scheme may be used. The secure computation apparatus group executes digit extension processing and multiplication processing along with secure exchange of data between at least two secure computation apparatuses. The secure exchange of the data is executed using distribution numbers obtained by distributing, using the additive secret sharing scheme, at least two random numbers whose digits are equal to the digit of the data and the product of the at least two random numbers to at least two secure computation apparatuses.

The secure computation apparatus group generates extended fixed-point numbers formed from extended data distribution values, extended sign distribution values, and extended carry distribution values, all of which are obtained by extending digit numbers using the data distribution values, the sign distribution values and the carry distribution values of fixed-point numbers while protecting a security. Next, the secure computation apparatus group generates extended data distribution values, extended sign distribution values, and extended carry distribution values of an extended multiplication result of multiplying a first extended fixed-point number and a second extended fixed-point number while protecting a security. Then, the secure computation apparatus group adjusts the digit numbers of the extended data distribution values of the extended multiplication result to make distribution values of a secure multiplication result. That is, to obtain the distribution values of the secure multiplication result, with respect to the extended multiplication result, the low-order digit of each extended data distribution value is removed, each sign distribution value is extracted, and each carry distribution value is extracted.

Note that in the following description, x[1], x[2], x[i], x[n], or the like represents a distribution value to a component i of a numerical value x, and x{1}, x{k}, x{j}, or the like represents a value (binary value) of a digit j of the numerical value x. In addition, +, *, and ^represent addition, multiplication, and exponentiation, respectively, a mod b represents a remainder obtained by dividing a by b, and a∥b represents bit connection of a and b.

<<Technical Premise>>

A technical premise of this example embodiment will be described first. As the technical premise, a secret sharing scheme and a secure computation scheme will be explained. The secret sharing scheme is used to input, to a system, data to be computed in the secure computation scheme.

(Secret Sharing Scheme)

The secret sharing scheme is a technique of generating a plurality of pieces of distribution information from secure information. The pieces of distribution information are created so that secure information can be reconstructed from a predetermined combination of pieces of distribution information but cannot be reconstructed from other combinations. The predetermined combination can take various structures, and such structures are called access structures. A threshold access structure will be described as a representative access structure. The threshold access structure can be represented by two parameters of the number n of pieces of generated distribution information and a threshold k. This is a structure in which the secure information can be reconstructed from k or more pieces of distribution information but cannot be reconstructed from less than k pieces of distribution information. The secret sharing scheme of the threshold access structure in which n represents the number of pieces of distribution information and k represents the threshold will be referred to as a (k, n) scheme hereinafter.

As the (k, n) scheme, a method (described in [non-patent literature 1]) proposed by Shamir is representative. In this specification, this method will be referred to as the Shamir (k, n) scheme hereinafter. As a basic method of an (n, n) scheme, there is known a method in which, to distribute an m-bit value x, m-bit random values r[2], . . . , r[n] are generated and v[1]=(x+r[2]+ . . . +r[n]) mod 2^m, v[2]=r[2], . . . , v[n]=r[n] are held as pieces of distribution information. If all the pieces of distribution information are obtained, all the random values added to v[1] can be removed, thereby reconstructing the value x. In this way, a method such that generation processing of each piece of distribution information is formed by only addition/subtraction on mod 2^m by excluding generation of random numbers is held as an additive (n, n) scheme on 2^m. 2^m changes depending on a modulus used.

Similarly, a (k(<n), n) scheme is also known, in which the generation processing of each piece of distribution information is formed by only addition/subtraction on mod 2^m by excluding generation of random numbers. As an example, a (2, 3) scheme that distributes an m-bit value will be described below.

Distribution processing when x represents an input value is implemented by the following processing.

(1) r1, r2, and r3 are randomly generated so that r1+r2+r3=0 mod 2^m is satisfied.

(2) Assuming that x[1]=(r1, r3−x), x[2]=(r2, r1−w), and x[3]=(r3, r2−w), x[1], x[2], and x[3] are output as three shares (distribution values, divided values).

The values distributed by the above method can reconstruct x from two or more pieces of distribution information. Such method is generally called the additive (k, n) scheme.

(Secure Computation Scheme)

A technique capable of executing computation related to data distributed by the secret sharing scheme is called a secure computation scheme. In the secure computation scheme, an operation for a data group distributed and saved in a plurality of servers by the secret sharing scheme can be executed without reconstructing data. By using the secure computation scheme, it is possible to distribute and register data in the plurality of servers, and execute an arbitrary operation related to the registered data. By distributing and saving, in a plurality of servers, data to be computed, and analyzing the data by the secure computation scheme, it is possible to execute various analysis operations without the server knowing analysis target data or an analysis result. Note that the result of the operation executed by the secure computation scheme is saved in each server in a secret shared form. Therefore, if it is desired to obtain the operation result, the pieces of distribution information associated with the operation result are collected to reconstruct the operation result.

As the secure computation scheme, there are provided various methods. Methods (described in [non-patent literature 2], [non-patent literature 3], and the like) assuming that data is distributed using the Shamir (k, n) scheme are representative. [Non-patent literature 2] describes a secure computation scheme for executing addition/subtraction and multiplication. The method is described in which addition can be executed without performing communication between servers but multiplication requires two rounds of communication. [Non-patent literature 3] proposes a scheme that can execute multiplication in one round of communication. Various methods in which these basic operations are combined are proposed.

In secret sharing by the above-described additive (n, n) scheme, addition can be executed easily and multiplication can also be executed by a method (to be described later). Note that if addition/subtraction and multiplication can be executed, arbitrary processing can be executed.

There is known a method of executing secure computation associated with addition/subtraction and multiplication for values distributed using the above-described Shamir (k, n) scheme, additive (n, n) scheme, or additive (2, 3) scheme. The secret sharing scheme including a secure computation method sufficient for executing arbitrary processing will be referred to as a secret sharing scheme that can use secure computation hereinafter.

(Secure Computation Scheme for Multiplication of Fixed-Point Number Described in [Non-Patent Literature 4])

As a technical premise of a secure computation scheme for multiplication of a fixed-point number, a method described in [non-patent literature 4] will be described. This method poses a problem that the communication amount of preprocessing is very large.

This method is executed for data distributed by the Shamir (k, n) scheme. Since the Shamir (k, n) scheme can be used to distribute an integer value, a fixed-point number is processed as an integer value. This is a method of expressing a fixed-point number $a*2^{-f}$ by an integer value a when f represents an integer that defines the position of a decimal point. n pieces of distribution information generated by distributing the integer value x by the Shamir (k, n) scheme are written as x1, . . . , xn. [x] represents that n participants P1, . . . , Pn have x1, . . . , xn, respectively. In the Shamir (k, n) scheme, if an m-bit integer value is distributed, the pieces of distribution information of the value are values of 0, . . . , p−1 with respect to a prime number p larger than $2^m$, and each piece of distribution information is a value of m bits or more. An operation of executing the secure computation scheme for multiplication for a and b distributed by the Shamir (k, n) scheme, and storing a result in [c] is written as [c]←[a]*[b]. Similarly, an operation of executing a secure computation method for addition for a and b, and storing a result in [c] is written as [c]←[a]+[b].

In the method described in [non-patent literature 4], a method of computing $a*b^(-2f)$ as the product of $a*2^(-f)$ and $b*2^(-f)$ will be described. Assume that a and b are represented by m-digit numbers, respectively. Thus, a*b is a 2m-digit number, and processing of taking upper m digits is performed. Since a*b has 2m digits, it is assumed that if a and b are distributed, each of a and b is distributed and input using the Shamir (k, n) scheme that uses the prime number p larger than $2^{2m}$. As a protocol of this distribution processing, a secure computation protocol TrancPr ([a], k, m) that is explained as Protocol 3.1 of [non-patent literature 4] and right-shifts a k-digit distributed number [a] by m bits is used.

FPMul ([a], [b], 2m, f) by the secure computation method described in [non-patent literature 4] is as follows.

[a] and [b] are input, and the computation procedure of FPMul ([a], [b], 2m, f) is:

(11) [c]←[a]*[b]
(12) [d]←TrancPr ([c], 2m, f)

Then, [d] is output.

Next, processing of TrancPr ([c], 2m, f) to which the protocol TrancPr ([a], k, m) of [non-patent literature 4] is applied will be described. This protocol uses an algorism of distributing random 0 or 1, a secure computation protocol PRandBit ( ) for sharing random 1-bit information among participants, and a secure computation protocol PRandInt ( ) for sharing a designated x-bit length random number among participants.

[c], 2m, and f are input, and the computation procedure of TrancPr ([c], 2m, f) is:

(21) [ri]←PRandBit ( ) for i=0, . . . , f−1
(22) [r']←[r0]+[r1]*$2^1$+ . . . +[r{f−1}]*$2^(f-1)$
(23) [r"]←PRandInt (κ+2m−f)
(24) [r]←$2^f$*[r"]+[r']
(25) [c]←[a]+[r]
(26) c is reconstructed and shared among participants
(27) c'←c mod $2^f$
(28) [a']←c'−[r']
(29) [d]←[a]−[a']/$2^(-f)$
(30) [d] is output Among the above processes, PRandBit ( ) and PRandInt ( ) are independent of input values, and thus these processes can be executed at a stage before multiplication is executed. Most of the remaining processes are formed from light secure computation processing such as constant multiplication. Multiplication in the procedure of (1) of FPMul and reconstruction in the procedure of (6) of Tranc require communication. However, PRandBit ( ) requires a large amount of communication. With reference to [non-patent literature 5], even if the (2, 3) threshold scheme is used, several hundred-bit communication is required per bit. That is, for one multiplication operation associated with a fixed-point number, (several hundred*f)-bit communication is required for preprocessing. A method that suppresses an overall communication amount including such preprocessing is desirable.

Explanation of Example Embodiment

Processing of secret sharing and secure multiplication according to this example embodiment will be described below.

(Secret Sharing Processing of This Example Embodiment)

In this example embodiment, data is distributed by the (2, 2) scheme, and stored in two secure computation servers as a secure computation apparatus group. A detailed method of the (2, 2) scheme used in this example embodiment is as follows.

Note that a fixed-point number x to be distributed is assumed as follows. The fixed-point number x is represented by m-bit data and has a fixed point at the f-th digit from the least significant digit. The most significant digit is a sign bit s, and two's complement notation is used. Assume x'=x*$2^f$. x' for x is assumed to be the data value of the fixed-point number x.

(Data Distribution Method)

Input: fixed-point number x (x'=x*$2^f$)

(31) Select random value r from 0, . . . , ($2^m$)−1
(32) Set x[1]=r and x[2]=(x'+r) mod $2^m$
(33) Compute c=(x[1]+x[2])/$2^m$, and discard a fractional part
(34) Randomly select c[1] from {0, 1}
(35) Compute c[2]=(c+c[1]) mod 2
(36) Randomly select s[1] from {0, 1}
(37) Compute s[2]=(s+s[1]) mod 2
(38) Output v[1]=(x[1], c[1], s[1]) and v[2]=(x[2], c[2], s[2]) as two pieces of distribution information In this example,
x[1] and x[2] are values obtained by distributing the data value x' by the additive (2, 2) scheme on mod $2^m$.
c is a value obtained by discarding a fractional part of (x[1]+x[2])/$2^m$ by the additive (2, 2) scheme. This value is 1 when (x[1]+x[2]) is equal to or larger than $2^m$, and is 0 otherwise. That is, c represents whether an overflow (carry) occurs when distributing x by the additive (2, 2) scheme.
c[1] and c[2] are values obtained by distributing the carry c by the additive (2, 2) scheme.
s[1] and s[2] are values obtained by distributing the sign s of x by the additive (2, 2) scheme.

Note that attention needs to be paid to the fact that f is not related to the step of the above distribution processing. Therefore, assume that the data value is input to a secret sharing apparatus (a distribution information generation apparatus) that distributes a fixed-point number.

That is, in this example embodiment, each of the data value x' of the fixed-point number, the carry c occurring when distributing the data value, and the sign s of the data value is distributed by the additive (2, 2) scheme corresponding to its bit length.

(Secure Multiplication Processing of this Example Embodiment)

A method of performing multiplication for the fixed-point numbers x and y distributed by the above method will be described next. Note that the data values of x and y are given by x' $(=x*2^f)$ and y $(=y'*2^f)$.

Processing starts in a state in which the two fixed-point numbers x and y are distributed by the above-described method, and stored in two fixed-point number multiplication servers as secure computation apparatuses. Assume that the two fixed-point number multiplication servers include a fixed-point number multiplication server 1 (corresponding to the first secure computation apparatus) and a fixed-point number multiplication server 2 (corresponding to the second secure computation apparatus).

Two values $v[1]=(x[1], c[1], s[1])$ and $v[2]=(x[2], c[2], s[2])$ are generated from x, and two values $w[1]=(y[1], d[1], t[1])$ and $w[2]=(y[2], d[2], t[2])$ are generated from y. The fixed-point number multiplication server 1 stores v[1] and w[1], and the fixed-point number multiplication server 2 stores v[2] and w[2].

Assume that the fixed-point number multiplication servers 1 and 2 share the values obtained by distributing, by the additive (2, 2) scheme, 2m-bit random numbers r1 and r2 and $(r1*r2) \bmod 2^{(2m)}=r12$ as the product of the two random numbers on a modulus $2^{(2m)}$. More specifically, for $r1=(r1[1]+r1[2]) \bmod 2^{(2m)}$, $r2=(r2[1]+r2[2]) \bmod 2^{(2m)}$, and $r1*r2=(r12[1]+r12[2]) \bmod 2^{(2m)}$, the fixed-point number multiplication server 1 holds r1[1], r2[1], and r12[1], and the fixed-point number multiplication server 2 holds r1[2], r2[2], and r12[2]. If r1, r2, and r1*r2 are distributed by the additive (2, 2) scheme in this way, these values can be used to perform multiplication related to the values a and b distributed by the additive (2, 2) scheme. This scheme is efficient although a set of r1, r2, and r1*r2 needs to be distributed by the additive (2, 2) scheme for each multiplication operation. A detailed method is described in [non-patent literature 6] and the like. Communication executed in this step is 4 Kbits. Such set of r1, r2, and r3 is disposable, and cannot be used repeatedly. Therefore, such values need to be shared between the fixed-point number multiplication servers 1 and 2 by the necessary number of times of multiplication.

Similarly, assume that the fixed-point number multiplication servers 1 and 2 share values obtained by distributing, by the additive (2, 2) scheme, 1-bit random numbers r1 and r2 and r1*r2 mod 2 as the product of the two random numbers on a modulus 2. More specifically, for $r1=(r1[1]+r1[2]) \bmod 2$, $r2=(r2[1], r2[2]) \bmod 2$, and $r1*r2=(r12[1]+r12[2]) \bmod 2$, the fixed-point number multiplication server 1 holds r1[1], r2[1], and r12[1], and the fixed-point number multiplication server 2 holds r1[2], r2[2] and r12[2]. If r1, r2, and r1*r2 are distributed by the additive (2, 2) scheme in this way, these values can be used to perform multiplication related to the values a and b distributed by the additive (2, 2) scheme. This scheme is efficient although a set of r1, r2, and r1*r2 needs to be distributed by the additive (2, 2) scheme for each multiplication operation. A detailed method is described in [non-patent literature 6] and the like. Communication executed in this step is 2 bits. Such set of r1, r2, and r3 is disposable, and cannot be used repeatedly. Therefore, such values need to be shared between the fixed-point number multiplication servers 1 and 2 by the necessary number of times of multiplication.

When it is described that secure computation of computing multiplication of a and b distributed between the fixed-point number multiplication servers 1 and 2 is executed, it is assumed that multiplication is performed along with communication using the above-described set of three random numbers.

Furthermore, if the fixed-point number multiplication servers 1 and 2 distribute a 1-bit value B by the additive (2, 2) scheme on a modulus 2, the fixed-point number multiplication server 1 holds B[1], and the fixed-point number multiplication server 2 holds B[2], a value equal to b can be redistributed by the following processing.

(41) The fixed-point number multiplication server 1 randomly selects B'[1,1] and B'[1,2] from {0, 1} so that $B[1]=(B'[1,1]+B'[1,2]) \bmod 2$ is satisfied, and sends B'[1,2] to the fixed-point number multiplication server 2.

(42) The fixed-point number multiplication server 2 randomly selects B'[2,1], B'[2,2] from {0,1} so that $B[2]=(B'[2,1]+B'[2,2]) \bmod 2$ is satisfied, and sends B'[2,1] to the fixed-point number multiplication server 1.

(43) The fixed-point number multiplication server 1 computes $B'[1]=(B'[1,1]+B'[2,1]) \bmod 2$.

(44) The fixed-point number multiplication server 2 computes $B'[2]=(B'[1,2]+B'[2,2]) \bmod 2$.

As a result of the above processing, $B'[1]+B'[2]=B'[1,1]+B'[2,1]+B'[1,2]+B'[2,2]=B[1]+B[2]=(B \bmod 2)$ is obtained, and thus B'[1] and B'[2] are pieces of distribution information of the same value as B. In the above step, B is never reconstructed. Since the processes of (41) and (42) can be executed in parallel, the above processing is executed in one round of communication for 2 bits. After that, if a given value is redistributed, this is described that the given value is redistributed. However, assume that the above-described processing is executed.

(Secure Multiplication Procedure)

(51) The following processing is executed for j=1, ..., m. Note that c{m}=c is set.

(51-1) Secure computation of executing $x\{m+j\}=s+c\{m+j-1\}$ is executed. Note that pieces of distribution information of a result are represented by $x[1]\{m+j\}$ and $x[2]\{m+j\}$. The fixed-point number multiplication server i (i=1, 2) holds $x[i]\{m+j\}$.

(51-2) Secure computation of executing $y\{m+j\}=t+d\{m+j-1\}$ is executed. Note that pieces of distribution information of a result are represented by $y[1]\{m+j\}$ and $y[2]\{m+j\}$. The fixed-point number multiplication server i (i=1, 2) holds $y[i]\{m+j\}$.

(51-3) Secure computation of executing $c\{m+j\}=x[1]\{m+j\}+(x[1]\{m+j\}+x[2]\{m+j\})(x[2]\{m+j\}+c\{m+j-1\}+1)$ is executed. Note that pieces of distribution information of a result are represented by $c\{m+j\}[1]$ and $c\{m+j\}[2]$. The fixed-point number multiplication server i (i=1, 2) holds $c[i]\{m+j\}$. Note that the fixed-point number multiplication servers, that respectively hold $x[1]\{m+j\}$ and $x[2]\{m+j\}$ values, execute the above processing without revealing the respectively held values by redistributing the respectively held values.

(51-4) Secure computation of executing $d\{m+j\}=y[1]\{m+j\}+(y[1]\{m+j\}+y[2]\{m+j\})(y[2]\{m+j\}+d\{m+j+1\}+1)$ is executed. Note that pieces of distribution information of a result are represented by d[1]{m+1} and d[2]{m+1}. The fixed-point number multiplication server i (i=1, 2) holds d[i]{m+1}. Note that the fixed-point number multiplication servers, that respectively hold y[1]{m+1} and y[2]{m+1} values, execute the above processing without revealing the respectively held values by redistributing the respectively held values.

(52) For i=1, 2, x'[i]=x[i]{m+f}‖x[i]{m+f−1}‖ . . . ‖x[i]{m+1}‖x[i] and y'[i]=y[i]{m+f}‖y[i]{m+f−1}‖ . . . ‖y[i]{m+1}‖y[i] are held.

(53) Secure computation corresponding to z'=(x'*y') mod $2^{(m+f)}$ is executed. Note that pieces of distribution information of a result are represented by z'[1] and z'[2]. The fixed-point number multiplication server i (i=1, 2) holds z'[i]. The j-th bit of z'[i] (i=1, 2) from the least significant bit is represented by z'[i]{j}.

(54) For j=1, . . . , f+m, the following processing is executed. Note that c{0}=0 is set.

(54-1) Secure computation of executing e{j}=z'[1]{j}+(z'[1]{j}+z'[2]{j})(z[2]{j}+e{j−1}+1) is executed. Note that pieces of distribution information of a result are represented by e[1]{j} and e[2]{j}. The fixed-point number multiplication server i (i=1, 2) holds e[i]{j}. Note that the fixed-point number multiplication servers, that respectively hold z[1]{j} and z[2]{j} values, execute the above processing without revealing the respectively held values by redistributing the respectively held values.

(54-2) When j=f+m, distribution information obtained by redistributing e{j} is represented by e[i] (i=1, 2). The fixed-point number multiplication server i (i=1, 2) holds e[i].

(55) For j=2, u[i]=(s[i]+t[i]) mod 2 is computed. The fixed-point number multiplication server i (i=1, 2) holds u[i].

(56) For i=1, 2, z[i]=z'[i]{m+f}‖z'[i]{m+f−1}‖ . . . ‖z'[i]{f} is held, and the output of the fixed-point number multiplication server i is a set of z[i], u[i], and e[i].

(Explanation of Each Processing Procedure)

The meaning of the above-described processing will be explained next. In this example embodiment, when computation of the fixed-point numbers x and y is executed to compute a product of them, a multiplication result x'y' of x' (=x*$2^f$) and y' (=y*$2^f$) as data values of the fixed-point numbers is computed first. Since this result x'y' represents x'y'*2{−f}, a method of right-shifting x'y' by f bits (discarding lower f bits) is used to obtain an answer in order to obtain a desired result xy=x'y'*$2^{(-2f)}$.

The processing of (51) will be described first. This processing is processing of converting the two data values x' and y' distributed by the additive (2, 2) scheme on a modulus $2^{(m)}$ into values distributed by the additive (2, 2) scheme on a modulus $2^{(m+f)}$. The reason why it is necessary to change the modulus to $2^{(m+f)}$ is to obtain an m-bit result even after discarding f bits. When increasing the modulus, processing of a sign bit needs to be considered.

As for the processing of the sign bit, when m-bit data using complement notation is represented using m+f bits for multiplication, if upper f bits are filled with the sign bits, a correct multiplication result is obtained. When m=4 and f=2, the multiplication result is 111110 in binary notation if a data value is a floating-point number, and 000110 if a data value is 0110. To determine values to be arranged in higher bits, when distributing the data value, the sign is individually distributed. However, simply arranging four values obtained by redistributing the sign bit is insufficient. This is because a carry occurs.

As an example, if a data value D=0110 is distributed to D[1]=1101 and D[2]=1001, D[1]+D[2]=10110 and (10110) mod 10000=0110 are obtained. If 00 is added as sign bits to high-order positions of these values, it is assumed that E=00 is distributed to E[1]=11 and E[2]=01 by the additive (2, 2) scheme. If D'[1]=E[1]‖D[1]=111101 and D'[2]=E[2]‖D[2]=011001, (D'[1]+D'[2]) mod 100000=010110 is obtained, and 00 as a sign is not arranged. Therefore, a high-order digit needs to be added by a method of setting, as sign bits, a result of considering a carry. To add sign bits in consideration of a carry, a 1 bit representing whether a carry has occurred in the values obtained by distributing the data value is distributed.

Contents of the processing of (51) will be described in more detail next. In this processing, the same processing is executed for the two values x and y, and thus the processes ((51-1) and (51-3)) associated with x will be described.

In (51-1), secure computation for distributing a value of an (m+j)-th bit is executed. In this secure computation, a value such that x{m+j} used as a value of the (m+j)-th bit of the value x is equal to a sign s even by considering c{m+j−1} as a carry from the (m+j−1)-th bit is computed. Table 1 represents x{m+j} using a truth table.

TABLE 1

| s | c{m + j − 1} | x{m + k} |
|---|---|---|
| 0 | 0 | 0 |
| 1 | 0 | 1 |
| 0 | 1 | 1 |
| 1 | 1 | 0 |

That is, x{m+j} is represented by x{m+j}=(s+c{m+j−1}) mod 2. As a result of this secure computation, x{m+j} is distributed to generate x[1]{m+j} and x[2]{m+j}.

In (51-3), whether a value (x[1]{m+j}+x[2]{m+j}+c{m+j−1} of the (m+j)-th bit is two or more (if the value is two or more, 1 is set; otherwise, 0 is set) is computed, and c{m+j} is held. This value represents whether a carry to a value of the (m+j+1)-th bit occurs. Table 2 represents c{m+j} using a truth table.

TABLE 2

| x[1]{m + j} | x[2]{m + j} | c{m + j − 1} | c{m + j} |
|---|---|---|---|
| 0 | 0 | 0 | 0 |
| 1 | 0 | 0 | 0 |
| 0 | 1 | 0 | 0 |
| 0 | 0 | 1 | 0 |
| 1 | 1 | 0 | 1 |
| 0 | 1 | 1 | 1 |
| 1 | 0 | 1 | 1 |
| 1 | 1 | 1 | 1 |

That is, c{m+j} is represented by c{m+j}=(x[1]{m+j}+(x[1]{m+j}+x[2]{m+j})(x[2]{m+j}+c{m+j−1}+1)) mod 2. In the additive (2, 2) scheme, communication is not required for addition/subtraction, and is required for multiplication. Therefore, even the same operation is desirably performed by decreasing the number of times of multiplication as much as possible. In the above-described method, multiplication is performed once. As a result of secure computation of computing c{m+j}, c[1]{m+j} and c[2]{m+j} are generated.

By the processes of (51-1) and (51-3), x[i]{m+1}, . . . , x[i]{m+m} are generated. Since these values have m bits added to the high-order position of x[i], x[i]{m+m}‖x[i]{m+m−1}‖ . . . ‖x[i]{m+f}‖x[i] is a desired extension result.

The processing of (53) is processing of performing secure computation of x'*y' on mod $2^{\wedge}(m+f)$. The data value x'*y' represents a fixed-point number x'*y'*$2^{\wedge}\{-f\}$. It is desirable to compute x'*y'*$2^{\wedge}\{-2f\}$ from this value. Since multiplication by $2^{\wedge}\{-1\}$ corresponds to discarding of a lower 1 bit, it is possible to obtain a desired value by discarding lower f bits of x'*y'. That is, processing of extracting the (f+1)-th to (f+m)-th bits from x'*y' is executed.

With respect to the multiplication result of (54), processing of determining the (f+k)-th bit will be described. In (54), for j=1, . . . , m, c{j}=(z'[1]{j}+(z'[1]{j}+z'[2]{j})(z[2]{j}+c{j−1}+1)) mod 2 is computed. This computation is performed to determine whether a carry to the (j+1)-th bit occurs. The reason why the carry is obtained by this computation is the same as in (51-3). As a result of this processing, the carry is obtained in a form in which a carry c{f} for the (f+1)-th bit is distributed.

In the processing of (55), the sign of the computation result is computed. Since a positive number corresponds to 0 and a negative number corresponds to 1, computation can be performed by adding a share associating with sign on mod 2. This is because when a positive number corresponds to 0 and a negative number corresponds to 1, "negative×negative=positive" is maintained from (1+1) mod 2.

The above procedure is formed by the following procedures.

(1) Secure computation of extending the modulus of the data value (2) Secure computation of multiplication in the modulus after extension (3) Secure computation associated with processing of discarding lower bits (4) Distribution processing of a carry and a sign <<Arrangement for Implementing this Example Embodiment>>

The arrangements and operations of a system and apparatus for implementing secret sharing processing and secure multiplication processing according to this example embodiment will be described below.

<<Secure Computation System>>

FIG. 2 is a block diagram showing the arrangement of a secure computation system 200 according to this example embodiment.

With reference to FIG. 2, the secure computation system 200 according to this example embodiment includes a distribution information generation apparatus 210 as a fixed-point number distribution apparatus, and at least two secure computation apparatuses 220 and 230 connected via a network 240.

The distribution information generation apparatus 210 includes a data value distributor 211, a sign distributor 212, a carry distributor 213, and a random number distributor 214, and generates data values, signs, carries, and random numbers of at least two fixed-point numbers and distributes them to the at least two secure computation apparatuses 220 and 230.

The secure computation apparatus 220 includes a distribution information storage unit 221 that stores the distribution information transmitted from the distribution information generation apparatus 210, and a multiplication processor 222 that executes secure multiplication while performing data exchange with the other secure computation apparatus 230 with protecting a security. The secure computation apparatus 230 includes a distribution information storage unit 231 that stores the distribution information transmitted from the distribution information generation apparatus 210, and a multiplication processor 232 that executes secure multiplication while performing data exchange with the other secure computation apparatus 220 with protecting a security.

The multiplication processors 222 and 232 correspond to a secure digit extender and secure multiplier that perform digit extension and secure multiplication in cooperation with each other while performing data exchange with protecting a security.

Note that the random number distributor 214 may be an apparatus separated from the distribution information generation apparatus 210. In addition, the distribution information storage units 221 and 231 may be formed as distribution information storage devices outside the secure computation apparatuses, respectively.

<<Functional Arrangement of Distribution Information Generation Apparatus>>

Figure 3:
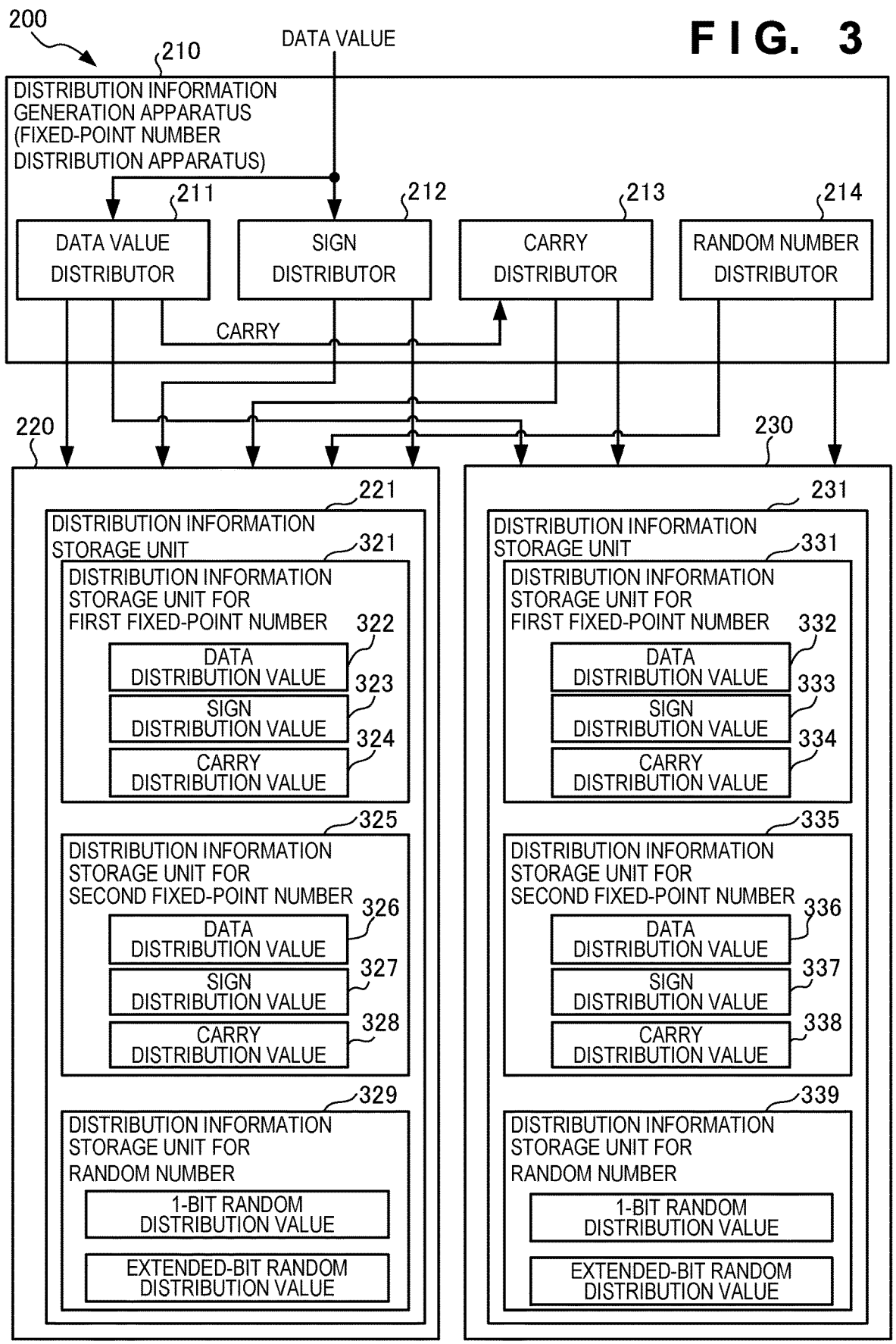
FIG. 3 is a block diagram showing the functional arrangement of a distribution information generation apparatus in the secure computation system according to the second example embodiment of the present invention.

FIG. 3 is a block diagram showing the functional arrangement of the distribution information generation apparatus 210 in the secure computation system 200 according to this example embodiment. FIG. 3 also shows an arrangement in which the distribution information generation apparatus 210 distributes the generated pieces of distribution information to the distribution information storage unit 221 of the secure computation apparatus 220 and the distribution information storage unit 231 of the secure computation apparatus 230. Although a description assumes that f representing the position of a fixed point is fixed and an apparatus that uses f stores f in advance, f may be input to each apparatus.

The distribution information generation apparatus 210 as a fixed-point number distribution apparatus includes the data value distributor 211, the sign distributor 212, the carry distributor 213, and the random number distributor 214. The data value distributor 211 receives the data value x', and outputs the value x[i] (i=1, 2) obtained by distributing the data value by the additive (2, 2) scheme and the carry c for the distribution information of the data value. The sign distributor 212 receives the data value x', extracts the sign bit s from the data value x', and outputs the value s[i] (i=1, 2) obtained by distributing the sign bit by the additive (2, 2) scheme. The carry distributor 213 receives the carry c output from the data value distributor 211, and outputs the value c[i] (i=1, 2) obtained by distributing the data value by the additive (2, 2) scheme. The random number distributor 214 outputs at least two random numbers p and q with a bit count to undergo secure computation and distribution values (p[i], q[i], r=(p*q)[i]) (i=1, 2) of a multiplication result r=p*q of the random numbers.

The data value distributor 211, the sign distributor 212, the carry distributor 213, and the random number distributor 214 transmit the generated distribution values to the plurality of secure computation apparatuses 220 and 230, and store them in the distribution information storage units. Note that the random number distributor 214 may be provided in an apparatus other than the distribution information generation apparatus 210.

The secure computation apparatus 220 includes the distribution information storage unit 221, and the secure computation apparatus 230 includes the distribution information storage unit 231. The distribution information storage unit 221 includes a distribution information storage unit 321 for a first fixed-point number, a distribution information storage unit 325 for a second fixed-point number, and a distribution information storage unit 329 for a random number. Note that if there are three or more fixed-point numbers, distribution information storage units are further included. The first fixed-point number distribution information storage unit 321 stores a data distribution value 322, a sign distribution value 323, and a carry distribution value 324 of the first fixed-point number. The second fixed-point number distribution information storage unit 325 stores a data distribution value 326, a sign distribution value 327, and a carry distribution value 328 of the second fixed-point number. The random number distribution information storage unit 329 stores a distribution value of the 1-bit random number and a distribution value of the extended bit random number at the time of multiplication.

The distribution information storage unit 231 includes a distribution information storage unit 331 for a first fixed-point number, a distribution information storage unit 335 for a second fixed-point number, and a distribution information storage unit 339 for a random number. Note that if there are three or more fixed-point numbers, distribution information storage units are further included. The first fixed-point number distribution information storage unit 331 stores a data distribution value 332, a sign distribution value 333, and a carry distribution value 334 of the first fixed-point number. The second fixed-point number distribution information storage unit 335 stores a data distribution value 336, a sign distribution value 337, and a carry distribution value 338 of the second fixed-point number. The random number distribution information storage unit 339 stores a distribution value of the 1-bit random number and a distribution value of the extended bit random number at the time of multiplication.

For example, the pieces of data value distribution information x[i] (i=1, 2) obtained as the output of the data value distributor 211 by receiving the data value x' of the first fixed-point number x are distributed and stored in the data distribution value 322 of the first fixed-point number distribution information storage unit 321 and the data distribution value 332 of the first fixed-point number distribution information storage unit 331.

The pieces of sign distribution information s[i] (i=1, 2) obtained as the output of the sign distributor 212 by receiving the sign value s of the first fixed-point number x are distributed and stored in the sign distribution value 323 of the first fixed-point number distribution information storage unit 321 and the sign distribution value 333 of the first fixed-point number distribution information storage unit 331.

The pieces of carry distribution information c[i] (i=1, 2) obtained as the output of the carry distributor 213 by receiving the carry value c of the first fixed-point number x are distributed and stored in the carry distribution value 324 of the first fixed-point number distribution information storage unit 321 and the carry distribution value 334 of the first fixed-point number distribution information storage unit 331.

<<Functional Arrangement of Secure Computation Apparatus>>

Figure 4:
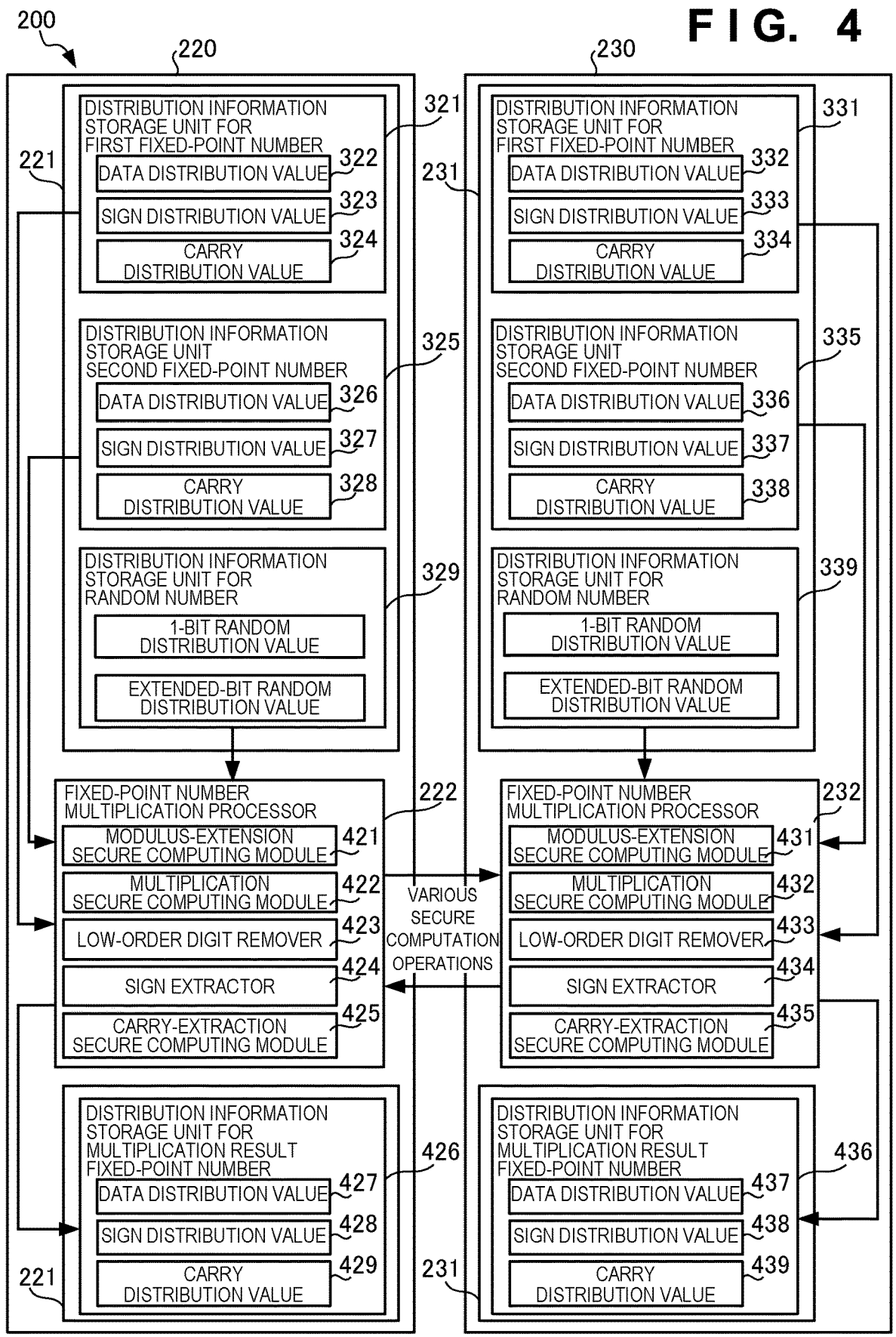
FIG. 4 is a block diagram showing the functional arrangement of a secure computation apparatus in the secure computation system according to the second example embodiment of the present invention.

FIG. 4 is a block diagram showing the functional arrangements of the secure computation apparatuses 220 and 230 in the secure computation system 200 according to this example embodiment. Note that in FIG. 4, the same reference numerals as in FIG. 3 denote the same components and a repetitive description thereof will be omitted.

The fixed-point number multiplication processor 222 of the secure computation apparatus 220 includes a modulus extension secure computing module 421, a multiplication secure computing module 422, a low-order digit remover 423, a sign extractor 424, and a carry extraction secure computing module 425. The fixed-point number multiplication processor 232 of the secure computation apparatus 230 includes a modulus extension secure computing module 431, a multiplication secure computing module 432, a low-order digit remover 433, a sign extractor 434, and a carry extraction secure computing module 435.

The modulus extension secure computing modules 421 and 431 respectively receive the data distribution values, sign distribution values, and carry distribution values of the first and second fixed-point numbers, and generate extended data distribution values, extended sign distribution values, and extended carry distribution values of the first and second extended fixed-point numbers while performing data exchange with protecting a security. In the data exchange with protecting a security, the 1-bit random distribution values of the random number distribution information storage units 329 and 339 are used. The modulus extension secure computing modules 421 and 431 correspond to a secure digit extender.

Based on the extended data distribution values, extended sign distribution values, and extended carry distribution values of the first and second extended fixed-point numbers that have undergone modulus extension, the multiplication secure computing modules 422 and 432 generate extended data distribution values, extended sign distribution values, and extended carry distribution values of an extended secure multiplication result while performing data exchange with protecting a security. In the data exchange with protecting a security, the extended bit random distribution values of the random number distribution information storage units 329 and 339 are used.

Each of the low-order digit removers 423 and 433 generates the data distribution value of a secure multiplication result as a fixed-point number from the extended data distribution value of the extended secure multiplication result. Each of the sign extractors 424 and 434 generates the sign distribution value of the secure multiplication result as the fixed-point number from the extended sign distribution value of the extended secure multiplication result. The carry extraction secure computing modules 425 and 435 generate the carry distribution values of the secure multiplication result as the fixed-point number from the extended data distribution values and extended carry distribution values of the extended secure multiplication result while performing data exchange with protecting a security.

Note that the multiplication secure computing module 422, low-order digit remover 423, sign extractor 424, and carry extraction secure computing module 425, and the multiplication secure computing module 432, low-order digit remover 433, sign extractor 434, and carry extraction secure computing module 435 correspond to a secure multiplier.

The data distribution value of the secure multiplication result as the output of the low-order digit remover 423 of the multiplication processor 222 is stored as a distributed data value 427 in a distribution information storage unit 426 for a multiplication result of the distribution information storage unit 221. The sign distribution value of the secure multiplication result as the output of the sign extractor 424 of the multiplication processor 222 is stored as a sign distribution value 428 in the multiplication result distribution information storage unit 426 of the distribution information storage unit 221. The carry distribution value of the secure multiplication result as the output of the carry extraction secure computing module 425 of the multiplication processor 222 is stored as a carry distribution value 429 in the multiplication result distribution information storage unit 426 of the distribution information storage unit 221.

On the other hand, the data distribution value of the secure multiplication result as the output of the low-order digit remover 433 of the multiplication processor 232 is stored as a data distribution value 437 in a distribution information storage unit 436 for the multiplication result of the distribution information storage unit 231. The sign distribution value of the secure multiplication result as the output of the sign extractor 434 of the multiplication processor 232 is stored as a sign distribution value 438 in the multiplication result distribution information storage unit 436 of the distribution information storage unit 231. The carry distribution value of the secure multiplication result as the output of the carry extraction secure computing module 435 of the multiplication processor 232 is stored as a carry distribution value 439 in the multiplication result distribution information storage unit 436 of the distribution information storage unit 231.

Note that the two fixed-point number distribution information storage units are configured to store pieces of distribution information of one value. However, a set of apparatuses may store a number of values. In this case, each value is added with identification information and stored.

In the above description, the method in which the additive (2, 2) scheme is used for distribution has been explained. However, another (k, n) scheme may be used. In this case, n fixed-point number distribution information storage units are provided, and the number of fixed-point number multiplication processors is equal to a number required in a corresponding secure computation method. Note that the difference from [non-patent literature 5] is that the method in [non-patent literature 5] performs a step of reconstructing once a multiplication result masked by a random number.

<<Explanation of Operation Procedure>>

The secure multiplication processing according to this example embodiment is divided into (1) processing of generating pieces of distribution information of fixed-point numbers, and (2) secure computation associated with multiplication of the fixed-point numbers, and the operation procedure will be described.

<<Hardware Arrangement of Distribution Information Generation Apparatus>>

Figure 5:
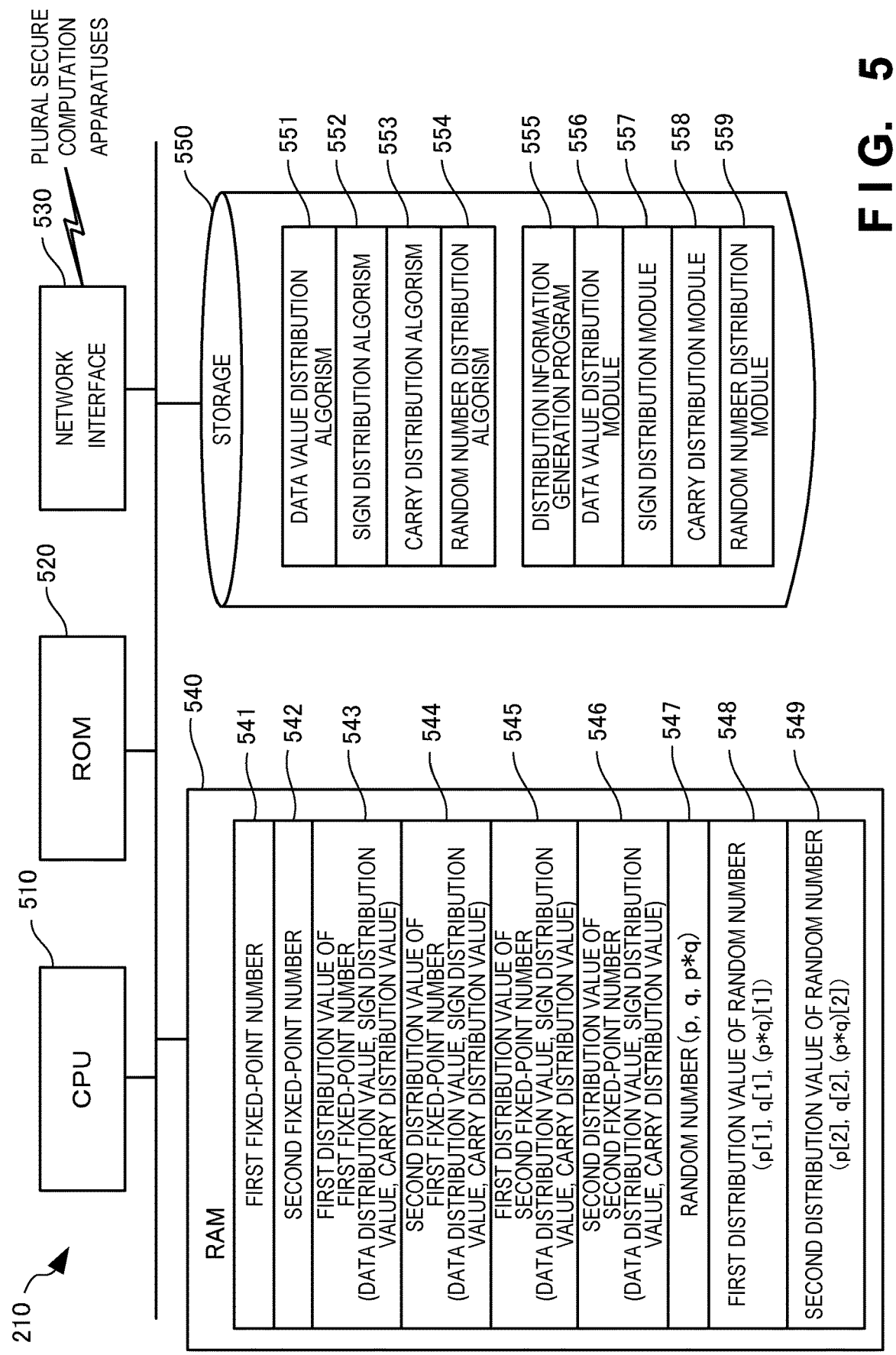
FIG. 5 is a block diagram showing the hardware arrangement of the distribution information generation apparatus according to the second example embodiment of the present invention.

FIG. 5 is a block diagram showing the hardware arrangement of the distribution information generation apparatus 210 according to this example embodiment.

In FIG. 5, a CPU (Central Processing Unit) 510 is an arithmetic control processor, and implements the functional components shown in FIG. 3 by executing a program. The CPU 510 may include a plurality of processors to execute different programs, modules, tasks, or threads, in parallel. A ROM (Read Only Memory) 520 stores permanent data such as initial data and a program, and programs. A network interface 530 controls communication with a plurality of secure computation apparatuses via a network.

A RAM (Random Access Memory) 540 is a random access memory used as a temporary storage work area by the CPU 510. An area to store data necessary for implementation of the example embodiment is allocated to the RAM 540. A first fixed-point number 541 is one of numbers to undergo secure multiplication in this example embodiment. A second fixed-point number 542 is the other one of the numbers to undergo secure multiplication in this example embodiment.

A first distribution value 543 of the first fixed-point number is one distribution value generated from the first fixed-point number 541, and includes a set of a data distribution value, a sign distribution value, and a carry distribution value. A second distribution value 544 of the first fixed-point number is the other distribution value generated from the first fixed-point number 541, and includes a set of a data distribution value, a sign distribution value, and a carry distribution value. The first distribution value 543 and the second distribution value 544 are transmitted to different secure computation apparatuses.

A first distribution value 545 of the second fixed-point number is one distribution value generated from the second fixed-point number 542, and includes a set of a data distribution value, a sign distribution value, and a carry distribution value. A second distribution value 546 of the second fixed-point number is the other distribution value generated from the second fixed-point number 542, and includes a set of a data distribution value, a sign distribution value, and a carry distribution value. The first distribution value 545 and the second distribution value 546 are transmitted to the different secure computation apparatuses.

A random number (p, q, p*q) 547 is a random number to be used for communication between the different secure computation apparatuses. The bit count of the random number is set in accordance with the bit count of data communicated between the different secure computation apparatuses. A first distribution value 548 of the random number is one distribution value generated from the random number (p, q, p*q) 547. A second distribution value 549 of the random number is the other distribution value generated from the random number (p, q, p*q) 547. The first distribution value 548 and the second distribution value 549 are transmitted to the different secure computation apparatuses.

A storage 550 stores a database, various parameters, or the following data or programs necessary for implementation of the example embodiment. A data value distribution algorism 551 is an algorism of distributing a data value of a multiplicand used in this example embodiment. A sign distribution algorism 552 is an algorism of distributing a sign of the multiplicand used in this example embodiment. A carry distribution algorism 553 is an algorism of distributing a carry of the multiplicand used in this example embodiment. A random number distribution algorism 554 is an algorism of distributing a random number of the multiplicand used in this example embodiment.

The storage 550 stores the following programs. A distribution information generation program 555 is a program that generates distribution information by controlling the distribution information generation apparatus 210. A data value distribution module 556 is a module that generates data distribution values from a fixed-point number. A sign distribution module 557 is a module that generates sign distribution values from the fixed-point number. A carry distribution module 558 is a module that generates carry distribution values of a carry occurring when the data value distribution module 556 generates the data distribution values from the fixed-point number. A random number distribution module 559 is a module that generates distributed random numbers from a random number.

Note that programs and data that are associated with the general-purpose functions of the distribution information generation apparatus 210 and other feasible functions are not shown in the RAM 540 or the storage 550 of FIG. 5.

<<Distribution Information Generation Processing>>

FIG. 6 is a flowchart illustrating the procedure of the distribution information generation processing of the distribution information generation apparatus 210 according to this example embodiment. This flowchart is executed by the CPU 510 of FIG. 5 using the RAM 540, thereby implementing the functional components of the distribution information generation apparatus 210 shown in FIG. 3.

In step S601, the distribution information generation apparatus 210 acquires a data value of a fixed-point number. In step S603, the distribution information generation apparatus 210 generates data distribution values by distributing the data value using the additive (2, 2) scheme, and outputs a carry associated with the data distribution values.

In step S605, the distribution information generation apparatus 210 extracts a sign from the data value, and generates sign distribution values by distributing the sign using the additive (2, 2) scheme. In step S607, the distribution information generation apparatus 210 generates carry distribution values by distributing, using the additive (2, 2) scheme, the carry value output in step S603.

In step S609, the distribution information generation apparatus 210 generates distribution values of at least two random numbers and a product of the at least two random numbers in correspondence with the bit counts of values exchanged during secure computation.

In step S611, the distribution information generation apparatus 210 transmits distribution values as sets of the data distribution values, the sign distribution values, and the carry distribution values to the fixed-point number distribution information storage units of the secure computation apparatuses to store them. Furthermore, the distribution information generation apparatus 210 transmits the distribution values of the at least two random numbers and the product of the random numbers to the random number distribution information storage units to store them. Note that the distribution values of the at least two random numbers and the product of the random numbers may be transmitted before each secure computation operation.

<<Hardware Arrangement of Secure Computation Apparatus>>

Figure 7:
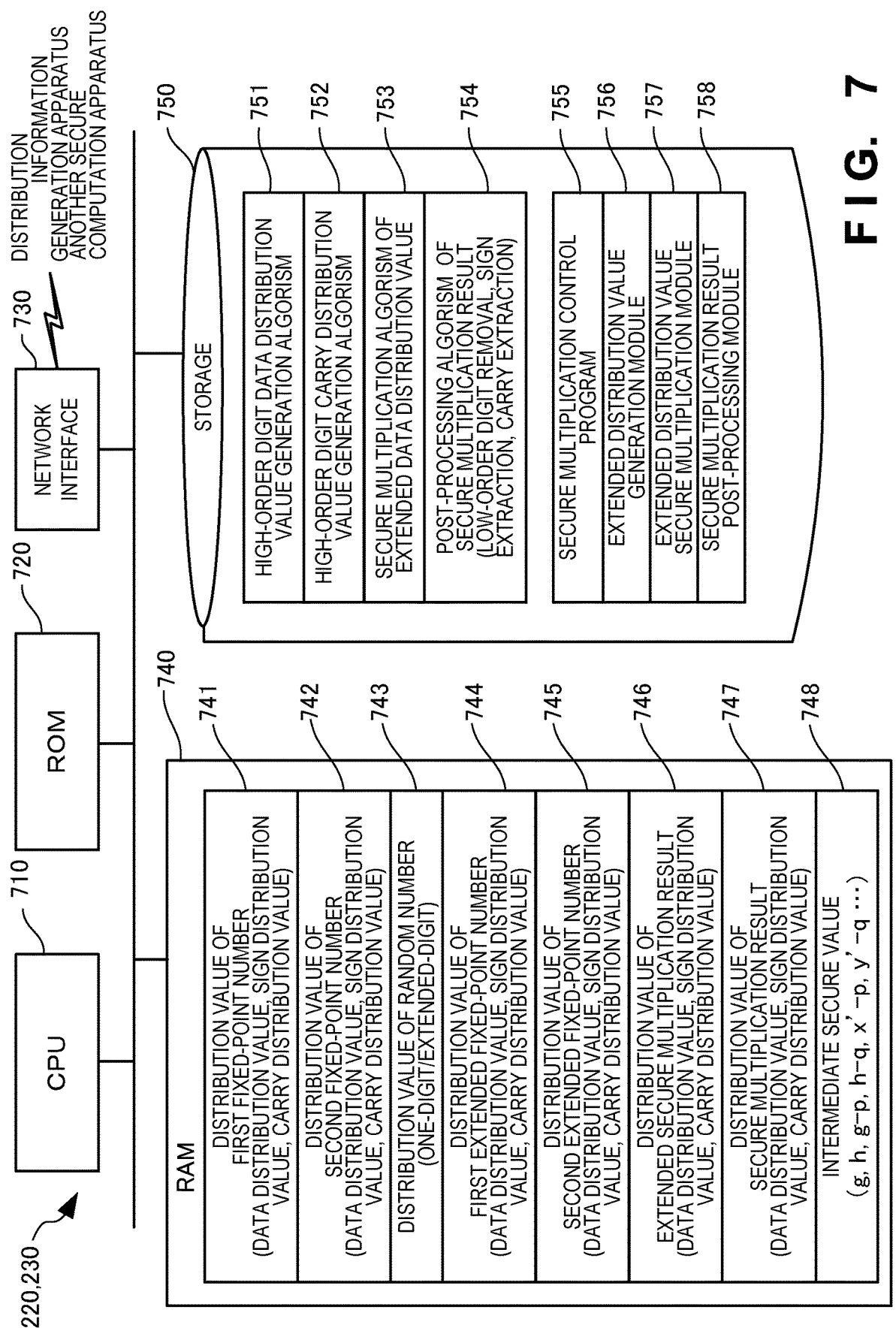
FIG. 7 is a block diagram showing the hardware arrangement of the secure computation apparatus according to the second example embodiment of the present invention.

FIG. 7 is a block diagram showing the hardware arrangement of the secure computation apparatus 220 or 230 according to this example embodiment. Note that FIG. 7 shows the arrangement of one of the secure computation apparatuses 220 and 230. A plurality of secure computation apparatuses shown in FIG. 7 execute secure multiplication while exchanging secure data.

In FIG. 7, a CPU 710 is an arithmetic control processor, and implements the functional components shown in FIG. 3 by executing a program. The CPU 710 may include a plurality of processors to execute different programs, modules, tasks, or threads, in parallel. A ROM 720 stores permanent data such as initial data and a program, and programs. A network interface 730 controls communication with the distribution information generation apparatus 210 or another secure computation apparatus via a network.

A RAM 740 is a random access memory used as a temporary storage work area by the CPU 710. An area to store data necessary for implementation of this example embodiment is allocated to the RAM 740. A distribution value 741 of the first fixed-point number is a distribution value of the first fixed-point number 541, and includes a set of a data distribution value, a sign distribution value, and a carry distribution value. A distribution value 742 of the second fixed-point number is a distribution value of the second fixed-point number 542, and includes a set of a data distribution value, a sign distribution value, and a carry distribution value. A distribution value 743 of the random number is a distribution value of the random number 547, and includes, in this example embodiment, a distribution value of a one-digit number and a distribution value of an extended-digit number of a multiplicand.

A distribution value 744 of the first extended fixed-point number is a distribution value of the first extended fixed-point number obtained by extending the digit number of the first fixed-point number by secure computation from the distribution value 741 of the first fixed-point number and the distribution value of the first fixed-point number stored in the other secure computation apparatus, and includes a set of a data distribution value, a sign distribution value, and a carry distribution value. A distribution value 745 of the second extended fixed-point number is a distribution value of the second extended fixed-point number obtained by extending the digit number of the second fixed-point number by secure computation from the distribution value 742 of the second fixed-point number and the distribution value of the second fixed-point number stored in the other secure computation apparatus, and includes a set of a data distribution value, a sign distribution value, and a carry distribution value.

A distribution value 746 of an extended secure multiplication result is a distribution value of the extended multiplication result of performing multiplication by secure computation from the distribution value 744 of the first extended fixed-point number, the distribution value 745 of the second extended fixed-point number, and the distribution value of the first extended fixed-point number and the distribution value of the second extended fixed-point number both of which are stored in the other secure computation apparatus, and includes a set of a data distribution value, a sign distribution value, and a carry distribution value.

A distribution value 747 of a secure multiplication result is a distribution value of a multiplication result obtained by removing the extended digit by secure computation from the distribution value 746 of the extended secure multiplication result and the distribution value of the extended secure multiplication result stored in the other secure computation apparatus, and includes a set of a data distribution value, a sign distribution value, and a carry distribution value.

An intermediate secret value 748 is an intermediate secret value using the distribution values of the random numbers used in digit extension of the fixed-point numbers, secure multiplication, and computation of the carry distribution values of the secure multiplication result, and includes g, h, (g−p), (h−g), (x'−p), and (y'−q) (to be described later).

A storage 750 stores a database, various parameters, or the following data or programs necessary for implementation of this example embodiment. A high-order digit data distribution value generation algorism 751 is an algorithm of generating a high-order digit of the data value of the multiplicand used in this example embodiment, and distributing it. A high-order digit carry distribution value generation algorism 752 is an algorithm of generating a high-order digit of the carry value of the multiplicand used in this example embodiment, and distributing it. A secure multiplication algorism 753 of an extended data distribution value is an algorithm of performing secure multiplication of the extended data distribution values of the multiplicand used in this example embodiment. A post-processing algorism 754 of a secure multiplication result is an algorithm of generating a secure multiplication result by removing the extended digit from the distribution values of the extended secure multiplication result, and includes low-order digit removing processing, sign extraction processing, and carry extraction processing.

The storage 750 stores the following programs. A secure multiplication control program 755 is a program that performs secure multiplication by controlling the secure computation apparatus 220 or 230. An extended distribution value generation module 756 is a module that generates extended data distribution values, extended sign distribution values, and extended carry distribution values as multiplication distribution values obtained by extending the digit in accordance with the data distribution value generation algorism 751 and the carry distribution value generation algorism 752. An extended distribution value secure multiplication module 757 is a module that performs secure multiplication using the extended data distribution values in accordance with the secure multiplication algorism 753. A secure multiplication result post-processing module 758 is a module that generates data distribution values, sign distribution values and carry distribution values of the secure multiplication result obtained by removing the extended digit from the extended secure multiplication result in accordance with the post-processing algorism 754.

Note that programs and data that are associated with the general-purpose functions of the secure computation apparatus 220 or 230 and other feasible functions are not shown in the RAM 740 or the storage 750 of FIG. 7.

<<Secure Multiplication Processing>>

Figure 8:
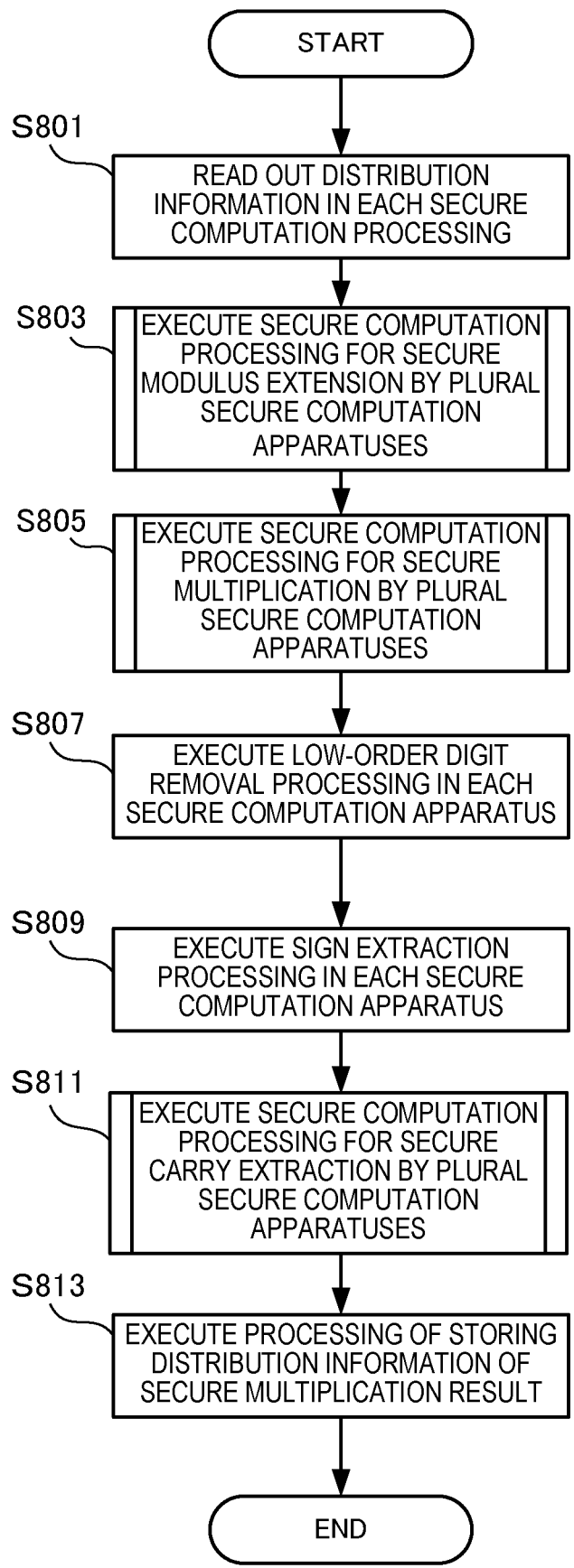
FIG. 8 is a flowchart illustrating the procedure of secure multiplication processing by a secure computation apparatus group according to the second example embodiment of the present invention.

FIG. 8 is a flowchart illustrating the procedure of secure multiplication processing by the secure computation apparatus group according to this example embodiment. This flowchart is executed by the CPU 710 of FIG. 7 using the RAM 740, thereby implementing the functional components of each of the secure computation apparatuses 220 and 230 of the secure computation apparatus group shown in FIG. 4.

In step S801, each of the secure computation apparatuses 220 and 230 of the secure computation apparatus group reads out distribution information from each of the distribution information storage units 221 and 231. That is, the multiplication processor 222 of the secure computation apparatus 220 reads out the data distribution value 322, sign distribution value 323, and carry distribution value 324 of the first fixed-point number from the first fixed-point number distribution information storage unit 321. The multiplication processor 222 reads out the data distribution value 326, sign distribution value 327, and carry distribution value 328 of the second fixed-point number from the second fixed-point number distribution information storage unit 325. On the other hand, the multiplication processor 232 of the secure computation apparatus 230 reads out the data distribution value 332, sign distribution value 333, and carry distribution value 334 of the first fixed-point number from the first fixed-point number distribution information storage unit 331. The multiplication processor 232 reads out the data distribution value 336, sign distribution value 337, and carry distribution value 338 of the second fixed-point number from the second fixed-point number distribution information storage unit 335.

In step S803, the secure computation apparatuses 220 and 230 of the secure computation apparatus group execute, in cooperation with each other, secure computation processing of generating extended data distribution values, extended sign values, and extended carriers of each of the first and second fixed-point numbers by exchanging data while protecting a security between the modulus extension secure computing modules 421 and 431.

In step S805, the secure computation apparatuses 220 and 230 of the secure computation apparatus group execute, in cooperation with each other, secure computation processing of obtaining extended data distribution values of an extended secure multiplication result of the first and second fixed-point numbers using the extended distributed data of the first fixed-point number and that of the second fixed-point number by exchanging data while protecting a security between the multiplication secure computing modules 422 and 432.

In step S807, the low-order digit removers 423 and 433 of the secure computation apparatuses 220 and 230 of the secure computation apparatus group respectively remove the low digits of the extended data distribution values of the extended multiplication result, thereby generating data distribution values of the multiplication result. In step S809, the sign extractors 424 and 434 of the secure computation apparatuses 220 and 230 of the secure computation apparatus group respectively extract sign distribution values of the multiplication result. In step S811, the secure computation apparatuses 220 and 230 of the secure computation apparatus group 102 execute, in cooperation with each other, secure computation processing of extracting carry distribution values using the extended data distribution values and extended carriers by exchanging data while protecting a security between the carry extraction secure computing modules 425 and 435.

In step S813, the secure computation apparatuses 220 and 230 of the secure computation apparatus group respectively store, in the distribution information storage units 426 and 436 of the fixed-point numbers of the multiplication result, the data distribution values, sign distribution values, and carry distribution values of the secure multiplication result of the first and second fixed-point numbers. That is, the secure computation apparatus 220 stores, in the fixed-point number distribution information storage unit 426, the data distribution value 427, sign distribution value 428, and carry distribution value 429 of the multiplication result. The secure computation apparatus 230 stores, in the fixed-point number distribution information storage unit 436, the data distribution value 437, sign distribution value 438, and carry distribution value 439 of the multiplication result.

(Secure Computation Processing in Modulus Extension (Digit Extension))

Figure 9A:
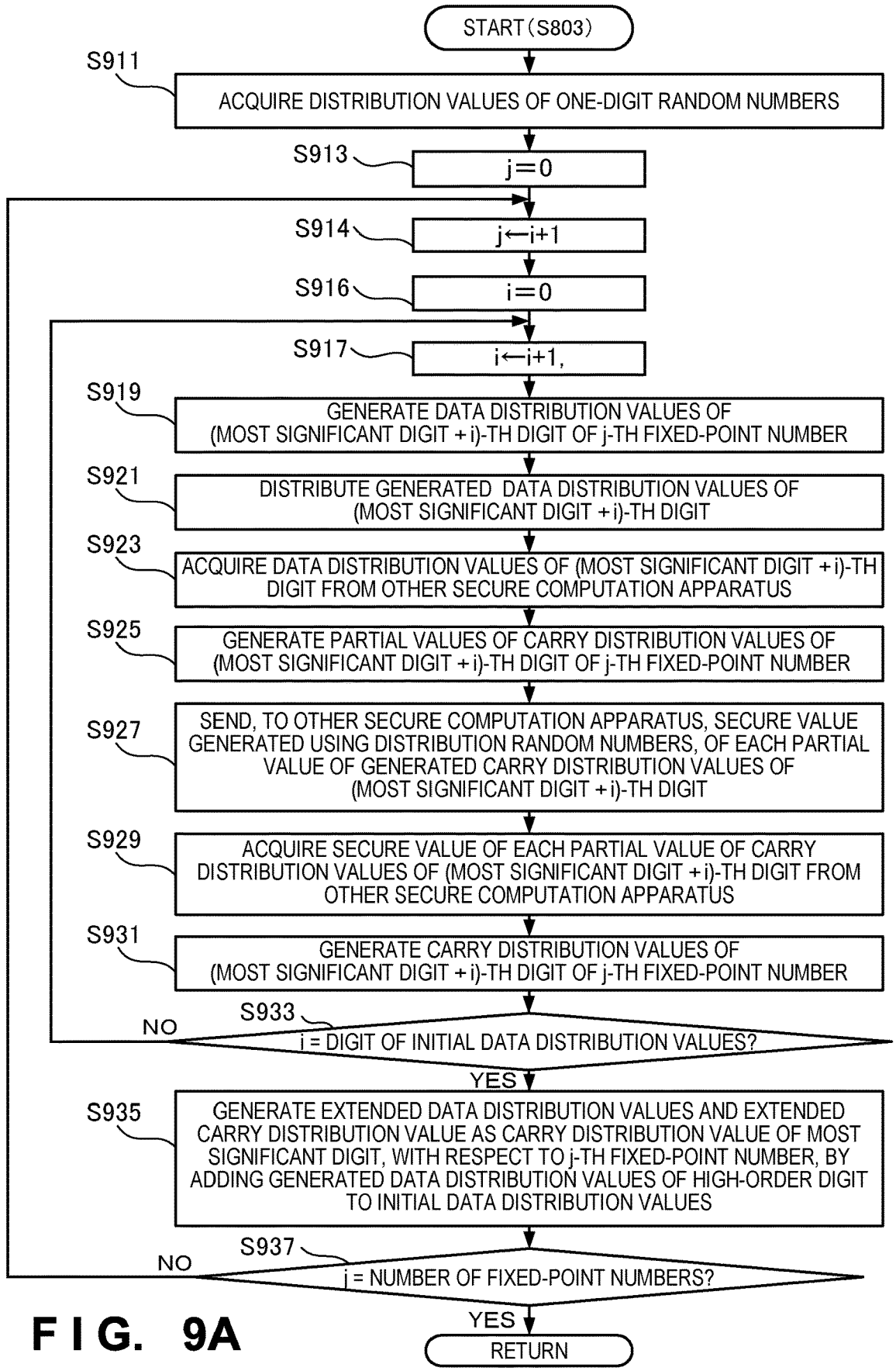
FIG. 9A is a flowchart illustrating the procedure of secure computation processing in modulus extension (digit extension) of each secure computation apparatus according to the second example embodiment of the present invention.

FIG. 9A is a flowchart illustrating the procedure of the secure computation processing (S803) in modulus extension (digit extension) of each of the secure computation apparatuses 220 and 230 according to this example embodiment. In a description of FIG. 9A, the processing of the secure computation apparatus 220 will be explained. Note that in this example embodiment, a number j of fixed-point numbers is 2.

In step S911, the secure computation apparatus 220 acquires distribution values of one-digit random numbers. The secure computation apparatus 220 initializes the control parameter j representing the number of fixed-point numbers to 0 in step S913, and increments j by one in step S914. The secure computation apparatus 220 initializes a control parameter i representing the number of added digits to 0 in step S916, and increments i by one in step S917.

In step S919, the secure computation apparatus 220 generates data distribution values of the (most significant digit+i)-th digit of the j-th fixed-point number. Then, the secure computation apparatus 220 distributes, in step S921, the generated distributed data of the (most significant digit+i)-th digit to the secure computation apparatus 220 and the other secure computation apparatus 230, and acquires, in step S923, the distributed data of the (most significant digit+i)-th digit from the other secure computation apparatus 230.

In step S925, the secure computation apparatus 220 generates partial values of the carry distribution values of the (most significant digit+i)-th digit of the j-th fixed-point number. Then, the secure computation apparatus 220 sends, in step S927, to the other secure computation apparatus 230, the secure value generated using distribution random numbers, of each partial value of the generated carry distribution values of the (most significant digit+i)-th digit, and acquires, in step S929, the secure value of each partial value of the carry distribution values of the (most significant digit+i)-th digit from the other secure computation apparatus 230. The partial values indicate "g" and "h" to be explained in the following detailed example, and the secure values of the partial values indicate (g−p) and (h−q).

In step S931, the secure computation apparatus 220 generates carry distribution values of the (most significant digit+i)-th digit of the j-th fixed-point number while protecting a security using the generated partial values and the acquired secure values of the partial values, or distribution values of the product r (=p*q) of the random numbers.

In step S933, the secure computation apparatus 220 determines whether i is equal to the digit of initial data distribution values. That is, it is determined whether the data distribution values are extended to double-digit values. If i is not equal to the digit of the initial data distribution values, the secure computation apparatus 220 returns to step S917 to increment i by one, and repeats steps S919 to S933.

If i is equal to the digit of the initial data distribution values, the secure computation apparatus 220 generates, in step S935, extended data distribution values and extended carry distribution value as carry distribution value of most significant digit, with respect to the j-th fixed-point number, by adding the generated data distribution values of a high-order digit to the initial data distribution values.

In step S937, the secure computation apparatus 220 determines whether j is equal to the number of fixed-point numbers. That is, it is determined whether all the fixed-point numbers to undergo secure multiplication have been extended. If j is not equal to the number of fixed-point numbers, the secure computation apparatus 220 returns to step S914 to increment j by one, and repeats steps S916 to S937. If j is equal to the number of fixed-point numbers, extension and distribution of all the fixed-point numbers to undergo secure multiplication have completed, and thus the secure computation processing in modulus extension ends.

(Secure Computation Processing in Multiplication)

Figure 9B:
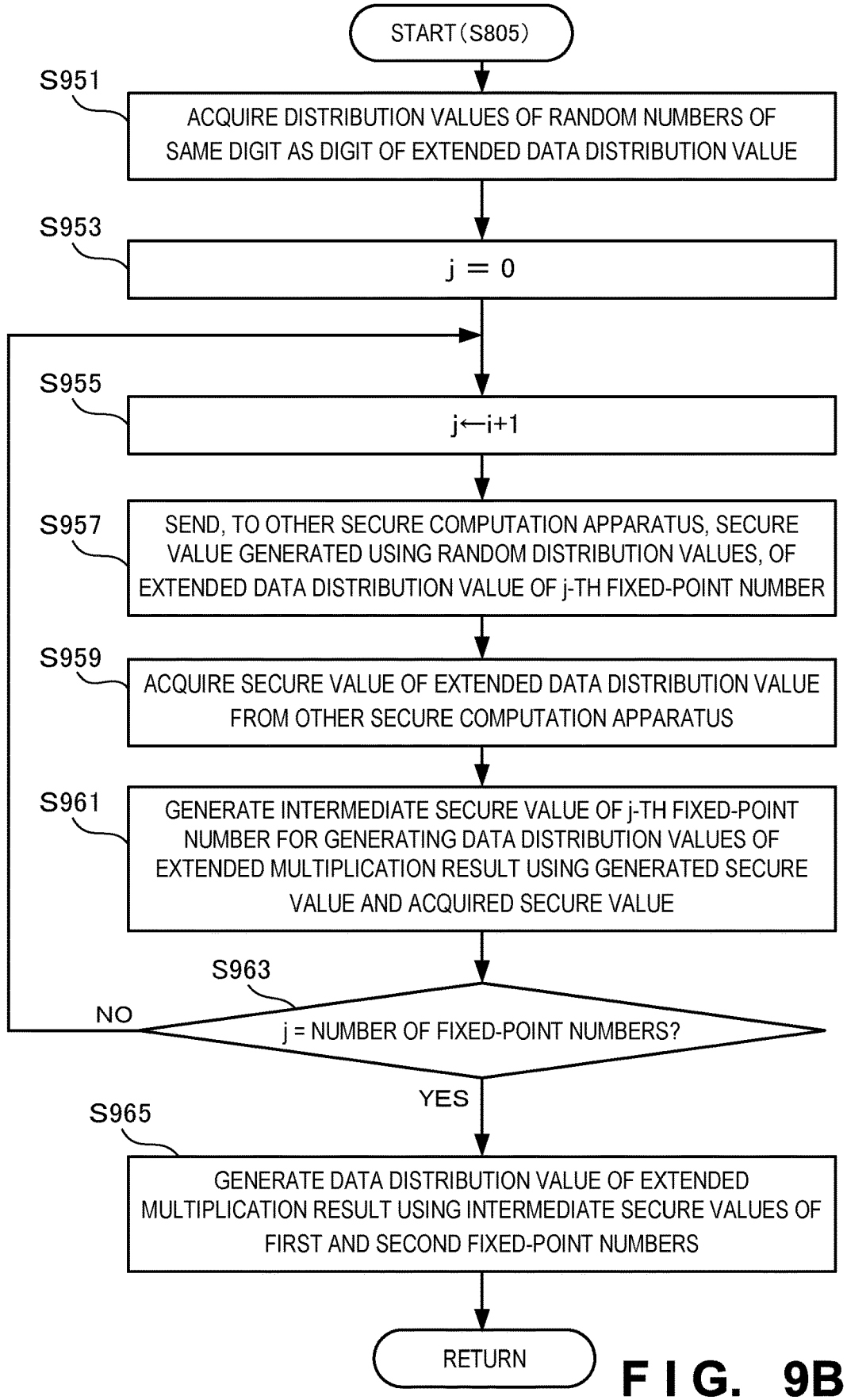
FIG. 9B is a flowchart illustrating the procedure of secure computation processing in multiplication of each secure computation apparatus according to the second example embodiment of the present invention.

FIG. 9B is a flowchart illustrating the procedure of the secure computation processing (step S805) in multiplication of each of the secure computation apparatuses 220 and 230 according to this example embodiment. In a description of FIG. 9B, the processing of the secure computation apparatus 220 will be explained. Note that in this example embodiment, the number j of fixed-point numbers is 2.

In step S951, the secure computation apparatus 220 acquires distribution values of random numbers of the same digit as that of the extended data distribution value. The secure computation apparatus 220 initializes the control parameter j representing the number of fixed-point numbers to 0 in step S953, and increments j by one in step S955.

The secure computation apparatus 220 sends, in step S957, to the other secure computation apparatus 230, the secure value generated using random distribution values, of the extended data distribution value of the j-th fixed-point number, and acquires, in step S959, the secure value of the extended data distribution value from the other secure computation apparatus 230. The secure value indicates (x'[1]−p[1]) mod $2^{(2m)}$ or (x'[2]−p[2]) mod $2^{(2m)}$ to be explained in the following detailed example. Note that in the next processing, the secure value is (y'[1]−q[1]) mod $2^{(2m)}$ or (y'[2]−q[2]) mod $2^{(2m)}$.

In step S961, the secure computation apparatus 220 generates an intermediate secure value of the j-th fixed-point number for generating the data distribution value of the extended multiplication result using the generated secure value and the acquired secure value. The intermediate secure value indicates (x'−p) to be explained in the following detailed example. Note that in the next processing, the intermediate secure value is (y'−q).

In step S963, the secure computation apparatus 220 determines whether j is equal to the number of fixed-point numbers. That is, it is determined whether all the secure values or intermediate secure values for secure multiplication have been prepared. If j is not equal to the number of fixed-point numbers, the secure computation apparatus 220 returns to step S955 to repeat generation, sending, and acquisition of a secure value and intermediate secure value from the extended data distribution value of the next fixed-point number.

If j is equal to the number of fixed-point numbers, all the secure values and intermediate secure values for secure multiplication have been prepared, and thus the secure computation apparatus 220 generates, in step S965, data distribution value of the extended multiplication result using the intermediate secure values of the first and second fixed-point numbers. Similarly, the other secure computation apparatus 230 also generates data distribution value of the extended multiplication result.

(Secure Computation Processing for Carry Extraction)

The secure computation processing for carry extraction in step S811 of FIG. 8 is processing similar to the processing of generating the carry distribution values of the high-order digit of step S803 as shown in FIG. 9A, and repetitive description thereof will be omitted.

<<Detailed Example of Secure Multiplication>>

An example in which detailed secret sharing and secure multiplication are performed in the secure computation system according to this example embodiment will be described below.

(Numerical Value Example)

A secure multiplication example based on this example embodiment of x*y=−5.0 for x=2.0 and y=+2.5 will be described. This secure multiplication operation is represented by 1110.0*0010.1=1011.0 in binary notation. That is, m (digit number)=5 and f (the digit after a decimal point)=1.

In multiplication when a complement number is used,
1111111100
*0000000101
1001111101100

Five digits from the sixth digit to the second digit from the least significant digit are obtained as a multiplication result.

<<Distribution of Numerical Value>>

(Distribution of x)

The data value x'(=11100) of x (=1110.0) is distributed to two servers.

If an arbitrary number between 0 and 11111 is set as r=11000, (x'+r) mod $2^{(=100000)}$=10100 is obtained. Then, x[1]=11000 is a distribution value to server 1 and x[2]=10100 is a distribution value to server 2. Note that the j-th digit of x[1] from the least significant digit is represented by x[1]{j}, and the j-th digit of x[2] from the least significant digit is represented by x[2]{j}.

(Carry of x': Distribution of c)

c=1 is distributed to c[1]=1 and c[2]=0.

(Sign of x: Distribution of s)

s=1 is distributed to s[1]=0 and s[2]=1.

Pieces of distribution information of x are represented by v[1]=(11000, 1, 0) and v[2]=(10100, 0, 1).

(Distribution of y)

The data value y' (=00101) of y (=0010.1) is distributed to two servers.

If an arbitrary number between 0 and 11111 is set as r=00100, (y'+r) mod 2^5(=100000)=01001 is obtained. Then, y[1]=00100 is a distribution value to server 1, and y[2]=01001 is a distribution value to server 2. Note that the j-th digit of y[1] from the least significant digit is represented by y[1]{j}, and the j-th digit of y[2] from the least significant digit is represented by y[2]{j}.

(Carry of y': Distribution of d)

d=0 is distributed to d[1]=0 and d[2]=0.

(Sign of y: Distribution of t)

t=0 is distributed to t[1]=0 and t[2]=0.

Pieces of distribution information of y are represented by w[1]=(00100, 0, 0) and w[2]=(01001, 0, 0).

As numerical values to undergo multiplication, v[1] and w[1] are distributed to server 1 and v[2] and w[2] are distributed to server 2.

<<Digit Extension of Numerical Value: Preparation Processing for Secure Multiplication>>

Digit extension processing is performed before multiplication. Note that only digit extension processing of distribution information about x will be described here. With respect to y, examples of the share values of the result of performing extension in the same method will be explained.

In a step of extension processing, random bit values p, q, and r satisfying p*q=r are multiply distributed between servers 1 and 2.

(p[2]−p[1]) mod 2=p (q[2]−q[1]) mod 2=q (r[2]−r[1]) mod 2=r=p*q

In this example, server 1 has p[1], q[1], and r[1], and server 2 has p[2], q[2], and r[2].

In digit extension of x, the sixth to 10th digits are generated. However, a computation process for the sixth digit will be described. The same procedure is performed for the remaining digits and a description thereof will be omitted. An extension result will be explained.

(Generation of Numerical Value of Sixth Digit)

In server 1, the sixth digit of x[1] is generated by x[1]{6}=(s[1]+c[1]) mod 2=1.

In server 2, the sixth digit of x[2] is generated by x[2]{6}=(s[2]+c[2]) mod 2=1.

(Redistribution of x[1]{6}=1)

Server 1 redistributes x[1]{6}. Note that x[1][1]{6} represents a distribution value of x[1]{6} to server 1, and x[2][1]{6} represents a distribution value of x[1]{6} to server 2. That is, x[2][1]{6} and x[1][1]{6} that satisfy (x[2][1]{6}−x[1][1]{6}) mod 2=x[1]{6} are computed and x[2][1]{6} is sent to server 2.

Assume that x[1][1]{6}=1 and x[2][1]{6}=0.

(Redistribution of x[2]{6}=1)

Server 2 redistributes x[2]{6}=1. Note that x[1][2]{6} represents a distribution value of x[2]{6} to server 1, and x[2][2]{6} represents a distribution value of x[2]{6} to server 2. That is, x[2][2]{6} and x[1][2]{6} that satisfy (x[2][2]{6}−x[1][2]{6}) mod 2=x[2]{6} are computed and x[1][2]{6} is sent to server 1.

Assume that x[1][2]{6}=1 and x[2][2]{6}=0.

(Generation of Carry of Sixth Digit)

With the above processing, the shares of the sixth digit can be computed. To compute the seventh digit, a carry from the sixth digit to the seventh digit is computed. c{6} as a carry from the sixth digit is associated with x[1]{6}, x[2]{6}, and c, and defined by a truth table of Table 3.

TABLE 3

| x[1]{6} | x[2]{6} | c | c{6} |
|---|---|---|---|
| 0 | 0 | 0 | 0 |
| 0 | 0 | 1 | 1 |
| 1 | 1 | 0 | 0 |
| 1 | 1 | 1 | 1 |
| 1 | 0 | 0 | 1* |
| 1 | 0 | 1 | 1 |
| 0 | 1 | 0 | 0 |
| 0 | 1 | 1 | 0* |

The above truth table is defined by
c{6}=(c+(x[1]{6}+x[2]{6})(x[2]{6}+c+1)) mod 2=(c+g*h) mod 2
where g=(x[1]{6}+x[2]{6}) and h=(x[2]{6}+c+1). This processing is computed by secure computation.

(Computation of Shares of g)

Each of g[1] and g[2] is computed by g=x[1]{6}+x[2]{6}.

Server 1 computes g[1]=(x[1][1]{6}+x[1][2]{6}) mod 2=(1+1) mod 2=0.

Server 2 computes g[2]=(x{2}[1]{6}+x{2}[2]{6}) mod 2=(0+0) mod 2=0.

(Computation of Shares of h)

Each of h[1] and h[2] is computed by h=x[2]{6}+c+1.

Server 1 computes h[1]=(x[1][2]{6}+c[1]) mod 2=(1+1) mod 2=0.

Server 2 computes h[2]=(x[2][2]{6}+c[2]+1) mod 2=(0+0+1) mod 2=1.

(Secure Computation of g*h)

In secure computation of g*h, the fact that g*h=p*q+(g−p)*q+(h−q)*p+(g−p)*(h−q) is satisfied is used. Because of communication between servers, for example, p=q=r=1 is held, and p[1]=1, p[2]=0, q[1]=1, q[2]=0, r[1]=0, and r[2]=1 are shared in advance. Server 1 has p[1], q[1], and r[1] and server 2 has p[2], q[2], and r[2].

(Secure Computation of (g−p))

Server 1 computes (g[1]−p[1]) mod 2=(0−1) mod 2=1, and sends it to server 2.

Server 2 computes (g[2]−p[2]) mod 2=(0−0) mod 2=0, and sends it to server 1.

Then, each of servers 1 and 2 computes (g[2]−p[2]−(g[1]−p[1])) mod 2, thereby obtaining (g−p)=1.

(Secure Computation of (h−q))

Server 1 computes (h[1]−q[1]) mod 2=(0−1) mod 2=1, and sends it to server 2.

Server 2 computes (h[2]−q[2]) mod 2=(1−0) mod 2=1, and sends it to server 1.

Then, each of servers 1 and 2 computes (h[2]−q[2]−(h[1]−q[1])) mod 2, thereby obtaining (h−q)=0.

(Computation of Shares gh[1] and gh[2] of g*h)

Server 1 computes gh[1]=(r[1]+(g−p)*q[1]+(h−q)*p[1]) mod 2=(0+1*1+0*1) mod 2=1.

Server 2 computes gh[2]=(r[2]+(g−p)*q[2]+(h−q)*p[2]+(g−p)*(h−q)) mod 2=(1+1*0+0*0+1*0) mod 2=1.

(Computation of Shares of c{6})

Server 1 computes c[1]{6}=(c[1]+gh[1]) mod 2=(1+1) mod 2=0.

Server 2 computes c[2]{6}=(c[2]+gh[2]) mod 2=(0+1) mod 2=1.

<<Extension Result>>

The above procedure is repeatedly used to compute the values of the seventh to 10th digits below.

x[1]{7}=0, c[1]{7}=1, x[2]{7}=0, c[2]{7}=0 x[1]{8}=1, c[1]{8}=1, x[2]{8}=1, c[2]{8}=0 x[1]{9}=1, c[1]{9}=1, x[2]{9}=1, c[2]{9}=0 x[1]{10}=1, c[1]{10}=0, x[2]{10}=1, c[2]{10}=1

The shares of c' (carry), the shares of s' (sign), and the shares of x' (10-digit) whose digits are extended to 10 by concatenating the above pieces of information as higher-order digits with the shares of five-digit x', are obtained. Note that the sign remains unchanged.

x'[1]: 1110111000
x'[2]: 1110110100
c'[1]=c[1]{10}: 0
c'[2]=c[2]{10}: 1
s'[1]: 0
s'[2]: 1

Similarly, the shares of d'(carry), the shares of t' (sign), and the shares of y' (10-digit) whose digits are extended to 10 by extending the digits of the shares of five-digit y' to higher-order side, are obtained. The sign remains unchanged.

y'[1]: 0100000100
y'[2]: 0100001001
d'[1]=d[1]{10}: 1
d'[2]=d[2]{10}: 1
t'[1]: 0
t'[2]: 0

<<Secure Multiplication>>

Next, for example, multiplication of extended x' and y' is executed using values p[1]=1000110011, p[2]=1111101011, q[1]=1110011010, q[2]=1011110100, r[1]=1111110000, and r[2]=1010100000 obtained by distributing p=0110111000, q=1101011010, and r=(p*q) mod 2^10=1010110000 to servers 1 and 2. Server 1 has p[1], q[1], and r[1], and server 2 has p[2], q[2], and r[2].

Then, x'y'[1]=(r[1]+(x'−p)*q[1]+(y'−q)*p[1]) mod 2^10 is computed as a multiplication distribution value of server 1, and x'y'[2]=(r[2]+(x'−p)*q[2]+(y'−q)*p[2]+(x'−p)*(y'−q)) mod 2^10 is computed as a multiplication distribution value of server 2.

(Secure Computation of Value Corresponding to (x'−p))

Server 1 computes (x'[1]−p[1]) mod 2^10=0110000101, and sends it to server 2.

Server 2 computes (x'[2]−p[2]) mod 2^=1111001001, and sends it to server 1.

Each of servers 1 and 2 computes (x'[2]−p[2]−(x'[1]−p[1])) mod 2^10, thereby obtaining a value=1001000100 corresponding to (x'−p).

(Secure Computation of Value Corresponding to (y'−q))

Server 1 computes (y'[1]−q[1]) mod 2^10=0101101010, and sends it to server 2.

Server 2 computes (y'[2]−q[2]) mod 2^10=1000010101, and sends it to server 1.

Each of servers 1 and 2 computes (y'[2]−q[2]−(y'[1]−q[1])) mod 2^10, thereby obtaining a value=0010101011 corresponding to (y'−q).

(Computation of Shares of Multiplication Result)

Server 1 computes x'y'[1]=(r[1]+(x'−p)*q[1]+(y'−q)*p[1]) mod 2^10=0011101001, and holds it as a share of server 1 of the multiplication result.

Server 2 computes x'y'[2]=(r[2]+(x'−p)*q[2]+(y'−q)*p[2]+(x'−p)*(y'−q)) mod 2^10=0011010101, and holds it as a share of server 2 of the multiplication result.

Note that it is apparent that 1111101100 of the secure computation result obtained by extending the digit is reconstructed by computing (0011010101−0011101001) mod 2^10 from the shares of x'y'[1] and x'y'[2].

<<Post-Processing of Secure Multiplication>>

(Digit Discarding Processing)

With respect to the shares of the respective servers, one low-order digit and four high-order digits are discarded to make the lengths uniform. More specifically, the second to sixth digits of x'y'[1] are extracted to obtain xy'[1]=10100. The second to sixth digits of x'y'[2] are extracted to obtain xy'[2]=01010. These values are the shares of the data value of the multiplication result.

(Computation of New Carry)

Distribution values of a carry to the next digit are computed, from the low-order digit, from each digit of xy'[1] and xy'[2] and distribution values of the carry for each digit. This secure computation may be performed by the same method as that used for digit extension. However, for the carry of the first digit, values obtained by distributing 0 are definitively used. If a value held by server 1 is c[1], and a value held by server 2 is c[2], it is determined to use one of combinations (0, 0) and (1, 1). Assume that the share of the carry of server 1 is e[1]=1, and the share of the carry of server 2 is e[2]=0.

(Computation of New Sign)

The sign of xy' is obtained by secure computation of (sign of x+sign of y) mod 2. This is obtained when each server obtains the sum of shares of the sign of x and the sign of y to compute mod 2. In this case, s=1 as the sign of x is distributed to s[1]=0 and s[2]=1, and t=0 as the sign of y is distributed to t[1]=0 and t[2]=0. The share u[1] of server 1 of the sign of x*y is (s[1]+t[1]) mod 2=0, and the share u[2] of server 2 of the sign of x*y is (s[2]+t[2]) mod 2=1. Therefore, (u[2]−u[1]) mod 2=1 is obtained, serving as the sign of xy.

<<Final Multiplication Result>>

Server 1 has xy'[1]=10100, e[1]=1, u[1]=0, and server 2 has xy'[2]=01010, e[2]=0, u[2]=1.

These values are the shares of the result of multiplying the fixed-point numbers x and y. (01010−10100) mod 2^5=10110 is obtained, and this corresponds to −5.0. It is apparent that the correct computation result is obtained while concealing the numerical values by secure computation. Note that an error may be generated by discarding a digit.

According to this example embodiment, the data distribution values, sign distribution values, and carry distribution values of each fixed-point number are generated and secure multiplication of the data distribution values and secure computation of the carry distribution values are made independent of each other. Therefore, it is possible to execute secure multiplication, in which a computed value, a computation result, and a value during computation cannot be known, while suppressing an overall communication amount.

For example, in the above detailed example, for a 5-bit fixed-point number, secure multiplication can be performed with the following communication amount.

A communication amount at the time of secure extension processing for the extended data distribution values and extended carry distribution values of 10-bit extended fixed-point numbers is 60 (=6×5×2) bits, since 6 bits are required for communication per extension of a bit, a number of extended bits is 5 and a number of the extended fixed-point numbers is 2. In secure multiplication of data distribution values of the 10-bit extended fixed-point numbers, 40 (=10× 4) bits are required. Assuming that secure computation of carry distribution values of the secure multiplication result is the same as the above secure extension processing, 60 bits are required.

Therefore, a communication amount between the secure computation apparatuses in secure multiplication is 32 (={60+40+60}/5) bits per bit of the fixed-point number, so it is possible that the present technique largely reduces a communication amount of several hundred bits per bit in [non-patent literature 4].

Other Example Embodiments

Note that this example embodiment has explained distribution and secure multiplication of fixed-point numbers by assuming the use of the additive (2, 2) scheme. However, distribution and secure multiplication of fixed-point numbers can be executed by another additive (k, n) scheme or a secure computation method based on the additive (k, n) scheme instead of the additive (2, 2) scheme, and it is thus possible to obtain the same effect of suppressing the overall communication amount as the present invention. That is, distribution information of a fixed-point number according to the present invention is distributed to a data value, sign, and carry. The distribution information is distributed by the additive (k, n) scheme, and secure computation is executed by a method corresponding to the additive (k, n) method used for the distribution processing.

Furthermore, in this example embodiment, each distribution value is stored in the storage unit of the secure computation apparatus. However, a storage device may be provided outside the secure computation apparatus, and the secure computation apparatus may centrally process secure computation.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided a secure computation system comprising:

a distribution information generation apparatus that generates, from at least two fixed-point numbers, data distribution values, sign distribution values and carry distribution values by distributing each of the at least two fixed-point numbers using an additive secret sharing scheme; and a secure computation apparatus group including at least two secure computation apparatuses, wherein the secure computation apparatus group comprises:

a secure digit extender that generates at least two extended fixed-point numbers formed from extended data distribution values, extended sign distribution values and extended carry distribution values, all of which are obtained by extending digit numbers using the data distribution values, the sign distribution values and the carry distribution values of the at least two fixed-point numbers while protecting a security; and a secure multiplier that generates extended data distribution values, extended sign distribution values and extended carry distribution values of an extended multiplication result of multiplying a first extended fixed-point number and a second extended fixed-point number that are generated by said secure digit extender while protecting a security, and adjusts digit numbers of the extended data distribution values of the extended multiplication result to make distribution values of a secure multiplication result.

(Supplementary Note 2)

There is provided the secure computation system according to supplementary note 1, wherein said distribution information generation apparatus comprises a distribution information generator that generates, from the at least two fixed-point numbers, the data distribution values obtained by distributing a data value of the each of the at least two fixed-point number using the additive secret sharing scheme, the sign distribution values obtained by distributing a sign of the each of the at least two fixed-point number using the additive secret sharing scheme, and the carry distribution values obtained by distributing, using the additive secret sharing scheme, carry values generated when distributing the data value, and said secure computation apparatus group comprises:

the secure digit extender that generates the extended data distribution values, the extended sign distribution values and the extended carry distribution values of the first extended fixed-point number obtained by extending a digit number using the data distribution values, the sign distribution values and the carry distribution values of a first fixed-point number while protecting a security, and generates data distribution values the extended data distribution values, the extended sign distribution values and the extended carry distribution values of the second extended fixed-point number obtained by extending a digit number using the data distribution values, the sign distribution values and the carry distribution values of a second fixed-point number while protecting a security, and the secure multiplier that generates the extended data distribution values, the extended sign distribution values and the extended carry distribution values of the extended multiplication result of multiplying the first extended fixed-point number and the second extended fixed-point number using the extended data distribution values, the extended sign distribution values and the extended carry distribution values of the first extended fixed-point number, and the extended data distribution values, the extended sign distribution values and the extended carry distribution values of the second extended fixed-point number while protecting a security, and adjusts the digit numbers of the extended data distribution values of the extended multiplication result to make the distribution values of the secure multiplication result.

(Supplementary Note 3)

There is provided the secure computation system according to supplementary note 1 or 2, wherein said secure computation apparatus group includes at least a first secure computation apparatus and a second secure computation apparatus, each of which stores distribution values and executes digit extension processing by said secure digit extender and multiplication processing by said secure multiplier along with secure exchange of data between the at least said first secure computation apparatus and said second secure computation apparatus, and the secure exchange of data is executed using distribution random numbers obtained by distributing, using the additive secret sharing scheme, at least two random numbers whose digits are equal to digits of the data and a product of the at least two random numbers to said first secure computation apparatus and said second secure computation apparatus.

(Supplementary Note 4)

There is provided the secure computation system according to any one of supplementary notes 1 to 3, wherein said secure multiplier comprises a low-order digit remover that removes low-order digits of the extended data distribution values of the extended multiplication result, a sign extractor that extracts the sign distribution values of the extended multiplication result, and a carry extractor that extracts the carry distribution values of the extended multiplication result.

(Supplementary Note 5)

There is provided the secure computation system according to supplementary note 3 or 4, wherein said secure digit extender comprises:

a random number distributor that distributes two one-digit random numbers and a product of the two one-digit random numbers to said first secure computation apparatus and said second secure computation apparatus using the additive secret sharing scheme, an extended digit data generator that computes, at said first secure computation apparatus, a first data distribution value of a (most significant digit+1)-th digit from a value of a most significant digit of the first data distribution value of a fixed-point number, the first sign distribution value and the first carry distribution value, and computes, at the second secure computation apparatus, a second data distribution value of a (most significant digit+1)-th digit from a value of a most significant digit of the second distribution data value of the fixed-point number, the second sign distribution value and the second carry distribution value, an extended digit data distributor that distributes each of the computed first data distribution value of the (most significant digit+1)-th digit and the computed second data distribution value of the (most significant digit+1)-th digit to said first secure computation apparatus and said second secure computation apparatus, an extended digit carry generator that generate, by said first secure computation apparatus and said second secure computation apparatus in cooperation with each other, a first carry distribution value of the (most significant digit+1)-th digit and a second carry distribution value of the (most significant digit+1)-th digit using the distributed first data distribution value of the (most significant digit+1)-th digit, the distributed second data distribution value of the (most significant digit+1)-th digit, carry distribution values of the most significant digit, and distribution random numbers of the two random numbers and the product of the two random numbers, an extended digit carry distributor that distributes each of the generated first carry distribution value of the (most significant digit+1)-th digit and the generated second carry distribution value of the (most significant digit+1)-th digit to said first secure computation apparatus and said second secure computation apparatus, and an extended fixed-point number generator that repeats, toward a higher-order digit, computation of data distribution values of a high-order digit by said extended digit data generator, distribution of the data distribution values of the high-order digit by said extended digit data distributor, generation of carry distribution values of the high-order digit by said extended digit carry generator, and distribution of the carry distribution values of the high-order digit by said extended digit carry distributor, adds a computed first data distribution value of the extended digit number to the high-order position of the first data distribution value of the fixed-point number to make a first extended data distribution value of the extended fixed-point number, generates a first extended carry value of the extended fixed-point number as a generated extended carry distribution value of the extended most significant digit, adds a computed second data distribution value of the extended digit number to the high-order position of the second data distribution value of the fixed-point number to make a second extended data distribution value of the extended fixed-point number, and generates a second extended carry distribution value of the extended fixed-point number as a generated extended carry distribution value of the extended most significant digit, and generates the first extended data distribution value, the second extended data distribution value, the first extended carry distribution value, and the second extended carry distribution value for each of the first fixed-point number and the second fixed-point number.

(Supplementary Note 6)

There is provided the secure computation system according to any one of supplementary notes 3 to 5, wherein said secure multiplier includes a random number distributor that distributes two random numbers of a same number of digits as digits of an extended fixed-point number and a product of the two random numbers to said first secure computation apparatus and said second secure computation apparatus using the additive secret sharing scheme, an extension multiplier that executes, by said first secure computation apparatus and said second secure computation apparatus in cooperation with each other, secure multiplication using the extended data distribution values of the first extended fixed-point number and the second extended fixed-point number, the two random numbers, and distribution random numbers of the two random number and the product of the two random numbers while protecting a security, to compute extended data distribution values of the extended multiplication result, and a digit adjuster that adjusts digits of the extended data distribution values of the extended multiplication result to generates data distribution values of the multiplication result.

(Supplementary Note 7)

There is provided the secure computation system according to any one of supplementary notes 1 to 6, further comprising a storage device that stores the distribution information generated by the distribution information generation apparatus.

(Supplementary Note 8)

There is provided a secure computation method for a secure computation system, comprising:

generating, from at least two fixed-point numbers, data distribution values, sign distribution values, and carry distribution values by distributing each of the at least two fixed-point number using an additive secret sharing scheme;

generating, at least two extended fixed-point numbers formed from extended data distribution values, extended sign distribution values and extended carry distribution values, all of which are obtained by extending digit numbers using the data distribution values, the sign distribution values and the carry distribution values of each fixed-point number while protecting a security; and generating extended data distribution values, extended sign distribution values and extended carry distribution values of an extended multiplication result of multiplying a first extended fixed-point number and a second extended fixed-point number that are generated in the extending digit numbers while protecting a security, and adjusting the digit numbers of the extended data distribution values of the extended multiplication result to make distribution values of a secure multiplication result.

(Supplementary Note 9)

There is provided a distribution information generation apparatus comprising:

a data value distributor that distributes data values of at least two fixed-point numbers using an additive secret sharing scheme for secure multiplication;

a sign distributor that distributes sign values of the at least two fixed-point numbers using the additive secret sharing scheme for the secure multiplication; and a carry distributor that distributes, using the additive secret sharing scheme for the secure multiplication, carry values occurring when distributing the data values of the at least two fixed-point numbers using the additive secret sharing scheme.

(Supplementary Note 10)

There is provided the distribution information generation apparatus according to supplementary note 9, wherein the additive secret sharing scheme is an additive (2, 2) scheme usable by a secure computation method.

(Supplementary Note 11)

There is provided the distribution information generation method comprising:

distributing data values of at least two fixed-point numbers using an additive secret sharing scheme for secure multiplication;

distributing sign values of the at least two fixed-point numbers using the additive secret sharing scheme for the secure multiplication; and distributing, using the additive secret sharing scheme for the secure multiplication, carry values occurring when distributing the data values of the at least two fixed-point numbers using the additive secret sharing scheme.

(Supplementary Note 12)

There is provided the distribution information generation program for causing a computer to execute a method, comprising:

distributing data values of at least two fixed-point numbers using an additive secret sharing scheme for secure multiplication;

distributing sign values of the at least two fixed-point numbers using the additive secret sharing scheme for the secure multiplication; and distributing, using the additive secret sharing scheme for the secure multiplication, carry values occurring when distributing the data values of the at least two fixed-point numbers using the additive secret sharing scheme.

(Supplementary Note 13)

There is provided a secure computation apparatus comprising:

a secure digit extender that generates at least two extended fixed-point numbers formed from extended data distribution values, extended sign distribution values, and extended carry distribution values, all of which are obtained by extending digit numbers using data distribution values, sign distribution values and carry distribution values of at least two fixed-point numbers and with referring while protecting a security extended data distribution values and extended carry distribution values generated from counterpart of distribution values the at least two fixed-point number; and a secure multiplier that generates extended data distribution values, extended sign distribution values and extended carry distribution values of an extended multiplication result of multiplying a first extended fixed-point number and a second extended fixed-point number with referring while protecting a security extended data distribution values and extended carry distribution values generated from counterpart of distribution values of at least two extended fixed-point numbers, and adjusts the digit numbers of the extended data distribution values of the extended multiplication result to make distribution values of a secure multiplication result.

(Supplementary Note 14)

There is provided the secure computation apparatus according to supplementary note 13, wherein said secure digit extender generates extended data distribution values, extended sign distribution values and extended carry distribution values of a first extended fixed-point number obtained by extending a digit number using data distribution values, sign distribution values and carry distribution values of a first fixed-point number and with referring while protecting a security extended data distribution values and extended distribution carry generated from counterpart of distribution values of the first fixed-point number, and generates extended data distribution values, extended sign distribution values and extended carry distribution values of a second extended fixed-point number obtained by extending a digit number using data distribution values, sign distribution values, and carry distribution values of a second fixed-point number and with referring while protecting a security extended data distribution values and extended carry distribution values generated from counterpart of distribution values of the second fixed-point number, and the secure multiplier generates extended data distribution values, extended sign distribution values, and extended carry distribution values of an extended multiplication result of multiplying the first extended fixed-point number and the second extended fixed-point number using the extended data distribution values, the extended sign distribution values and the extended carry distribution values of the first extended fixed-point number, and the extended data distribution values, the extended sign distribution values and the extended carry distribution values of the second extended fixed-point number, and with referring while protecting a security extended data distribution values and extended carry distribution values of the extended multiplication result generated from counterpart of distribution values of the first extended fixed-point number and the second extended fixed-point number, and adjusts digit numbers of distribution values of the extended multiplication result to make the distribution values of the secure multiplication result.

(Supplementary Note 15)

There is provided the secure computation apparatus according to supplementary note 13 or 14, wherein the secure computation apparatus executes digit extension processing by said secure digit extender and multiplication processing by said secure multiplier along with secure exchange of data with other secure computation apparatus, and the secure exchange of data is executed using distribution random numbers obtained by distributing, using an additive secret sharing scheme, at least two random numbers whose digits are equal to digits of the data and a product of the at least two random numbers to the secure computation apparatus and the other secure computation apparatus.

(Supplementary Note 16)

There is provided the secure computation apparatus according to supplementary note 15, wherein said secure multiplier includes a low-order digit remover that removes low-order digits of the extended data distribution values of the extended multiplication result, a sign extractor that extracts the sign distribution values of the extended multiplication result, and a carry extractor that extracts the carry distribution values of the extended multiplication result.

(Supplementary Note 17)

There is provided the secure computation apparatus according to supplementary note 15 or 16, wherein said secure digit extender includes a random number acquirer that acquires distribution random numbers obtained by distributing two one-digit random numbers and a product of the two one-digit random numbers using the additive secret sharing scheme, an extended-digit data generator that computes a first data distribution value of a (most significant digit+1)-th digit from a value of a most significant digit of a first data distribution value, a first sign distribution value and a first carry distribution value of the fixed-point number an extended-digit data distributor that distributes the computed first data distribution value of the (most significant digit+1)-th digit to the secure computation apparatus and the other secure computation apparatus, an extended-digit data acquirer that acquires a distribution value of a second data distribution value of the (most significant digit+1)-th digit of the fixed-point number computed in the other secure computation apparatus, an extended-digit carry generator that generates a first carry distribution value of the (most significant digit+1)-th digit using a distribution value of the first data distribution value of the (most significant digit+1)-th digit, a distribution value of the second data distribution value of the (most significant digit+1)-th digit, the carry distribution value of the most significant digit, distribution random numbers of the two random numbers and the product of the two random numbers, an extended-digit carry distributor that distributes the generated first carry distribution value of the (most significant digit+1)-th digit to the secure computation apparatus and the other secure computation apparatus, and an extended fixed-point number generator that repeats, toward a higher-order digit, computation of a data distribution value of a high-order digit by said extended-digit data generator, distribution of the data distribution value of the high-order digit by said extended-digit data distributor, generation of a carry distribution value of the high-order digit by said extended-digit carry generator, and distribution of the carry distribution value of the high-order digit by said extended-digit carry distributor, adds a computed first data distribution value of the extended digit number to the high-order position of the first data distribution value of the fixed-point number to make a first extended data value of the extended fixed-point number, and generates a first extended carry distribution value of the extended fixed-point number as a generated extended carry distribution value of the extended most significant digit, and generates the first extended data distribution value and the first extended carry distribution value for each of the first fixed-point number and the second fixed-point number.

(Supplementary Note 18)

There is provided the secure computation apparatus according to supplementary note 17, wherein said secure multiplier includes a random number acquirer that acquires distribution random numbers obtained by distributing two random numbers of same digits as digits of an extended fixed-point number and a product of the two random numbers using the additive secret sharing scheme, an extended data distribution value acquirer that acquires, from the other secure computation apparatus, second extended data distribution values of the first extended fixed-point number and the second extended fixed-point number which are concealed by the distribution random numbers of the two random numbers and the product of the two random numbers, an extension multiplier that computes a first extended data distribution value of the extended multiplication result based on the first extended data distribution values of the first extended fixed-point number and the second extended fixed-point number, and the concealed second extended data distribution values of the first extended fixed-point number and the second extended fixed-point number, and a digit adjuster that adjusts digits of the first extended data distribution value of the extended multiplication result, to generates a first data distribution value of the multiplication result.

(Supplementary Note 19)

There is provided a secure computation method for a secure computation apparatus, comprising:

generating at least two extended fixed-point numbers formed from extended data distribution values, extended sign distribution values, and extended carry distribution values, all of which are obtained by extending digit numbers using data distribution values, sign distribution values and carry distribution values of at least two fixed-point numbers and with referring while protecting a security extended data distribution values and extended carry distribution values generated from counterpart of distribution values the at least two fixed-point number; and generating extended data distribution values, extended sign distribution values and extended carry distribution values of an extended multiplication result of multiplying a first extended fixed-point number and a second extended fixed-point number with referring while protecting a security extended data distribution values and extended carry distribution values generated from counterpart of distribution values of at least two extended fixed-point numbers, and adjusting the digit numbers of the extended data distribution values of the extended multiplication result to make distribution values of a secure multiplication result.

(Supplementary Note 20)

There is provided a secure computation program for causing a computer to execute a method, comprising:

generating at least two extended fixed-point numbers formed from extended data distribution values, extended sign distribution values, and extended carry distribution values, all of which are obtained by extending digit numbers using data distribution values, sign distribution values and carry distribution values of at least two fixed-point numbers and with referring while protecting a security extended data distribution values and extended carry distribution values generated from counterpart of distribution values the at least two fixed-point number; and generating extended data distribution values, extended sign distribution values and extended carry distribution values of an extended multiplication result of multiplying a first extended fixed-point number and a second extended fixed-point number with referring while protecting a security extended data distribution values and extended carry distribution values generated from counterpart of distribution values of at least two extended fixed-point numbers, and adjusting the digit numbers of the extended data distribution values of the extended multiplication result to make distribution values of a secure multiplication result.

The invention claimed is:

1. A secure computation system comprising:
   a distribution information generation apparatus that generates data distribution values, sign distribution values and carry distribution values from at least two fixed-point numbers by distributing each of the at least two fixed-point numbers using an additive secret sharing scheme; and
   a secure computation apparatus group including at least two secure computation apparatuses,
   wherein the secure computation apparatus group comprises:
      a secure digit extender that generates at least two extended fixed-point numbers formed from extended data distribution values, extended sign distribution values and extended carry distribution values, all of which are obtained by extending digit numbers using the data distribution values, the sign distribution values and the carry distribution values of the at least two fixed-point numbers while performing data exchange with protecting security between the at least two secure computation apparatuses; and
      a secure multiplier that calculates distribution values of a secure multiplication result by generating extended data distribution values, extended sign distribution values and extended carry distribution values of an extended multiplication result of multiplying a first extended fixed-point number and a second extended fixed-point number that are generated by said secure digit extender while performing data exchange with protecting security between the at least two secure computation apparatuses and adjusting digit numbers of the extended data distribution values of the extended multiplication result.

2. The secure computation system according to claim 1, wherein
   said distribution information generation apparatus comprises a distribution information generator that generates, from the at least two fixed-point numbers, the data distribution values obtained by distributing a data value of the each of the at least two fixed-point number using the additive secret sharing scheme, the sign distribution values obtained by distributing a sign of the each of the at least two fixed-point number using the additive secret sharing scheme, and the carry distribution values obtained by distributing, using the additive secret sharing scheme, carry values generated when distributing the data value, and
   said secure computation apparatus group comprises:
      the secure digit extender that generates the extended data distribution values, the extended sign distribution values and the extended carry distribution values of the first extended fixed-point number obtained by extending a digit number using the data distribution values, the sign distribution values and the carry distribution values of a first fixed-point number while performing data exchange with protecting security between the at least two secure computation apparatuses, and generates data distribution values the extended data distribution values, the extended sign distribution values and the extended carry distribution values of the second extended fixed-point number obtained by extending a digit number using the data distribution values, the sign distribution values and the carry distribution values of a second fixed-point number while performing data exchange with protecting security between the at least two secure computation apparatuses; and
      the secure multiplier that generates the extended data distribution values, the extended sign distribution values and the extended carry distribution values of the extended multiplication result of multiplying the first extended fixed-point number and the second extended fixed-point number using the extended data distribution values, the extended sign distribution values and the extended carry distribution values of the first extended fixed-point number, and the extended data distribution values, the extended sign distribution values and the extended carry distribution values of the second extended fixed-point number while performing data exchange with protecting security between the at least two secure computation apparatuses, and adjusts the digit numbers of the extended data distribution values of the extended multiplication result to make the distribution values of the secure multiplication result.

3. The secure computation system according to claim 1, wherein said secure computation apparatus group includes at least a first secure computation apparatus and a second secure computation apparatus, each of which stores distribution values and executes digit extension processing by said secure digit extender and multiplication processing by said secure multiplier along with secure exchange of data between the at least said first secure computation apparatus and said second secure computation apparatus, and
   the secure exchange of data is executed using distribution random numbers obtained by distributing, using the additive secret sharing scheme, at least two random numbers whose digits are equal to digits of the data and a product of the at least two random numbers to said first secure computation apparatus and said second secure computation apparatus.

4. The secure computation system according to claim 1, wherein said secure multiplier comprises:
   a low-order digit remover that removes low-order digits of the extended data distribution values of the extended multiplication result;
   a sign extractor that extracts the extended sign distribution values of the extended multiplication result; and
   a carry extractor that extracts the extended carry distribution values of the extended multiplication result.

5. The secure computation system according to claim 3, wherein said secure digit extender is configured to:
   distribute random numbers by distributing two one-digit random numbers and a product of the two one-digit random numbers to said first secure computation apparatus and said second secure computation apparatus using the additive secret sharing scheme;
   generate data with extended digits by computing, at said first secure computation apparatus, a first data distribution value of a (most significant digit+1)-th digit from a value of a most significant digit of the first data distribution value of a fixed-point number, the first sign distribution value and the first carry distribution value, and computing, at the second secure computation apparatus, a second data distribution value of a (most significant digit+1)-th digit from a value of a most significant digit of the second distribution data value of the fixed-point number, the second sign distribution value and the second carry distribution value;

distribute the data with extended digits by distributing each of the computed first data distribution value of the (most significant digit+1)-th digit and the computed second data distribution value of the (most significant digit+1)-th digit to said first secure computation apparatus and said second secure computation apparatus;

generate carry with extended digits by generating, by said first secure computation apparatus and said second secure computation apparatus in cooperation with each other, a first carry distribution value of the (most significant digit+1)-th digit and a second carry distribution value of the (most significant digit+1)-th digit using the distributed first data distribution value of the (most significant digit+1)-th digit, the distributed second data distribution value of the (most significant digit+1)-th digit, carry distribution values of the most significant digit, and distribution random numbers of the two random numbers and the product of the two random numbers;

distribute the carry with extended digits by distributing each of the generated first carry distribution value of the (most significant digit+1)-th digit and the generated second carry distribution value of the (most significant digit+1)-th digit to said first secure computation apparatus and said second secure computation apparatus; and generate fixed point number with extended digits by repeating, toward a higher-order digit, computation of data distribution values of a high-order digit by generating the data with extended digits, distribution of the data distribution values of the high-order digit by distributing the data with extended digits, generation of carry distribution values of the high-order digit by generating the carry with extended digits, and distribution of the carry distribution values of the high-order digit by distributing the carry with extended digits, adds a computed first data distribution value of the extended digit number to the high-order position of the first data distribution value of the fixed-point number to make a first extended data distribution value of the extended fixed-point number, generating a first extended carry value of the extended fixed-point number as a generated extended carry distribution value of the extended most significant digit, adding a computed second data distribution value of the extended digit number to the high-order position of the second data distribution value of the fixed-point number to make a second extended data distribution value of the extended fixed-point number, and generating a second extended carry distribution value of the extended fixed-point number as a generated extended carry distribution value of the extended most significant digit, and wherein said secure digit extender generates the first extended data distribution value, the second extended data distribution value, the first extended carry distribution value, and the second extended carry distribution value for each of the first fixed-point number and the second fixed-point number.

6. The secure computation system according to claim 3, wherein said secure multiplier is configured to:

distribute random numbers by distributing two random numbers of a same number of digits as digits of an extended fixed-point number and a product of the two random numbers to said first secure computation apparatus and said second secure computation apparatus using the additive secret sharing scheme;

perform multiplication with extended digits by executing, by said first secure computation apparatus and said second secure computation apparatus in cooperation with each other, secure multiplication using the extended data distribution values of the first extended fixed-point number and the second extended fixed-point number, the two random numbers, and distribution random numbers of the two random number and the product of the two random numbers while performing data exchange with protecting security between the at least two secure computation apparatuses, to compute extended data distribution values of the extended multiplication result; and adjust digits by adjusting digits of the extended data distribution values of the extended multiplication result to generate data distribution values of the secure multiplication result.

7. The secure computation system according to claim 1, further comprising a storage device that stores the distribution information generated by the distribution information generation apparatus.

8. The secure computation system according to claim 2, wherein said secure computation apparatus group includes at least a first secure computation apparatus and a second secure computation apparatus, each of which stores distribution values and executes digit extension processing by said secure digit extender and multiplication processing by said secure multiplier along with secure exchange of data between the at least said first secure computation apparatus and said second secure computation apparatus, and the secure exchange of data is executed using distribution random numbers obtained by distributing, using the additive secret sharing scheme, at least two random numbers whose digits are equal to digits of the data and a product of the at least two random numbers to said first secure computation apparatus and said second secure computation apparatus.

9. The secure computation system according to claim 8, wherein said secure digit extender is configured to:

distribute random numbers by distributing two one-digit random numbers and a product of the two one-digit random numbers to said first secure computation apparatus and said second secure computation apparatus using the additive secret sharing scheme;

generate data with extended digits by computing, at said first secure computation apparatus, a first data distribution value of a (most significant digit+1)-th digit from a value of a most significant digit of the first data distribution value of a fixed-point number, the first sign distribution value and the first carry distribution value, and computing, at the second secure computation apparatus, a second data distribution value of a (most significant digit+1)-th digit from a value of a most significant digit of the second distribution data value of the fixed-point number, the second sign distribution value and the second carry distribution value;

distribute the data with extended digits by distributing each of the computed first data distribution value of the (most significant digit+1)-th digit and the computed second data distribution value of the (most significant digit+1)-th digit to said first secure computation apparatus and said second secure computation apparatus;

generate carry with extended digits by generating, by said first secure computation apparatus and said second secure computation apparatus in cooperation with each other, a first carry distribution value of the (most significant digit+1)-th digit and a second carry distribution value of the (most significant digit+1)-th digit using the distributed first data distribution value of the (most significant digit+1)-th digit, the distributed second data distribution value of the (most significant digit+1)-th digit, carry distribution values of the most significant digit, and distribution random numbers of the two random numbers and the product of the two random numbers;

distribute the carry with extended digits by each of the generated first carry distribution value of the (most significant digit+1)-th digit and the generated second carry distribution value of the (most significant digit+1)-th digit to said first secure computation apparatus and said second secure computation apparatus; and generate fixed point number with extended digits by repeating, toward a higher-order digit, computation of data distribution values of a high-order digit by generating the data with extended digits, distribution of the data distribution values of the high-order digit by distributing the data with extended digits, generation of carry distribution values of the high-order digit by generating the carry with extended digits, and distribution of the carry distribution values of the high-order digit by distributing the carry with extended digits, adds a computed first data distribution value of the extended digit number to the high-order position of the first data distribution value of the fixed-point number to make a first extended data distribution value of the extended fixed-point number, generating a first extended carry value of the extended fixed-point number as a generated extended carry distribution value of the extended most significant digit, adding a computed second data distribution value of the extended digit number to the high-order position of the second data distribution value of the fixed-point number to make a second extended data distribution value of the extended fixed-point number, and genereateing a second extended carry distribution value of the extended fixed-point number as a generated extended carry distribution value of the extended most significant digit, and wherein said secure digit extender generates the first extended data distribution value, the second extended data distribution value, the first extended carry distribution value, and the second extended carry distribution value for each of the first fixed-point number and the second fixed-point number.

10. The secure computation system according to claim 9, wherein said secure multiplier is configured to:

distribute random numbers by distributing two random numbers of a same number of digits as digits of an extended fixed-point number and a product of the two random numbers to said first secure computation apparatus and said second secure computation apparatus using the additive secret sharing scheme;

perform multiplication with extended digits by executing, by said first secure computation apparatus and said second secure computation apparatus in cooperation with each other, secure multiplication using the extended data distribution values of the first extended fixed-point number and the second extended fixed-point number, the two random numbers, and distribution random numbers of the two random number and the product of the two random numbers while performing data exchange with protecting security between the at least two secure computation apparatuses, to compute extended data distribution values of the extended multiplication result; and adjust digits by adjusting digits of the extended data distribution values of the extended multiplication result to generate data distribution values of the secure multiplication result.

11. The secure computation system according to claim 2, wherein said secure multiplier comprises a low-order digit remover that removes low-order digits of the extended data distribution values of the extended multiplication result, a sign extractor that extracts the extended sign distribution values of the extended multiplication result, and a carry extractor that extracts the extended carry distribution values of the extended multiplication result.

12. The secure computation system according to claim 11, wherein said secure digit extender is configured to:

distribute random numbers by distributing two one-digit random numbers and a product of the two one-digit random numbers to said first secure computation apparatus and said second secure computation apparatus using the additive secret sharing scheme;

generate data with extended digits by computing, at said first secure computation apparatus, a first data distribution value of a (most significant digit+1)-th digit from a value of a most significant digit of the first data distribution value of a fixed-point number, the first sign distribution value and the first carry distribution value, and computing, at the second secure computation apparatus, a second data distribution value of a (most significant digit+1)-th digit from a value of a most significant digit of the second distribution data value of the fixed-point number, the second sign distribution value and the second carry distribution value;

distribute the data with extended digits by distributing each of the computed first data distribution value of the (most significant digit+1)-th digit and the computed second data distribution value of the (most significant digit+1)-th digit to said first secure computation apparatus and said second secure computation apparatus;

generate carry with extended digits by generating, by said first secure computation apparatus and said second secure computation apparatus in cooperation with each other, a first carry distribution value of the (most significant digit+1)-th digit and a second carry distribution value of the (most significant digit+1)-th digit using the distributed first data distribution value of the (most significant digit+1)-th digit, the distributed second data distribution value of the (most significant digit+1)-th digit, carry distribution values of the most significant digit, and distribution random numbers of the two random numbers and the product of the two random numbers;

distribute the carry with extended digits by distributing each of the generated first carry distribution value of the (most significant digit+1)-th digit and the generated second carry distribution value of the (most significant digit+1)-th digit to said first secure computation apparatus and said second secure computation apparatus; and generate fixed point number with extended digits by repeating, toward a higher-order digit, computation of data distribution values of a high-order digit by generating the data with extended digits, distribution of the data distribution values of the high-order digit by distributing the data with extended digits, generation of carry distribution values of the high-order digit by generating the carry with extended digits, and distribution of the carry distribution values of the high-order digit by distributing the the carry with extended digits, adds a computed first data distribution value of the extended digit number to the high-order position of the first data distribution value of the fixed-point number to make a first extended data distribution value of the extended fixed-point number, generating a first extended carry value of the extended fixed-point number as a generated extended carry distribution value of the extended most significant digit, adding a computed second data distribution value of the extended digit number to the high-order position of the second data distribution value of the fixed-point number to make a second extended data distribution value of the extended fixed-point number, and generating a second extended carry distribution value of the extended fixed-point number as a generated extended carry distribution value of the extended most significant digit, and wherein said secure digit extender generates the first extended data distribution value, the second extended data distribution value, the first extended carry distribution value, and the second extended carry distribution value for each of the first fixed-point number and the second fixed-point number.

13. The secure computation system according to claim 12, wherein said secure multiplier is configured to:

distribute random numbers by distributing two random numbers of a same number of digits as digits of an extended fixed-point number and a product of the two random numbers to said first secure computation apparatus and said second secure computation apparatus using the additive secret sharing scheme;

perform multiplication with extended digits by executing, by said first secure computation apparatus and said second secure computation apparatus in cooperation with each other, secure multiplication using the extended data distribution values of the first extended fixed-point number and the second extended fixed-point number, the two random numbers, and distribution random numbers of the two random number and the product of the two random numbers while performing data exchange with protecting security between the at least two secure computation apparatuses, to compute extended data distribution values of the extended multiplication result; and adjust digits by adjusting digits of the extended data distribution values of the extended multiplication result to generate data distribution values of the secure multiplication result.

14. The secure computation system according to claim 4, wherein said secure digit extender is configured to:

distribute random numbers by distributing two one-digit random numbers and a product of the two one-digit random numbers to said first secure computation apparatus and said second secure computation apparatus using the additive secret sharing scheme;

generate data with extended digits by computing, at said first secure computation apparatus, a first data distribution value of a (most significant digit+1)-th digit from a value of a most significant digit of the first data distribution value of a fixed-point number, the first sign distribution value and the first carry distribution value, and computing, at the second secure computation apparatus, a second data distribution value of a (most significant digit+1)-th digit from a value of a most significant digit of the second distribution data value of the fixed-point number, the second sign distribution value and the second carry distribution value;

distribute the data with extended digits by distributing each of the computed first data distribution value of the (most significant digit+1)-th digit and the computed second data distribution value of the (most significant digit+1)-th digit to said first secure computation apparatus and said second secure computation apparatus;

generate carry with extended digits by generating, by said first secure computation apparatus and said second secure computation apparatus in cooperation with each other, a first carry distribution value of the (most significant digit+1)-th digit and a second carry distribution value of the (most significant digit+1)-th digit using the distributed first data distribution value of the (most significant digit+1)-th digit, the distributed second data distribution value of the (most significant digit+1)-th digit, carry distribution values of the most significant digit, and distribution random numbers of the two random numbers and the product of the two random numbers, generate fixed point number with extended digits by repeating, each of the generated first carry distribution value of the (most significant digit+1)-th digit and the generated second carry distribution value of the (most significant digit+1)-th digit to said first secure computation apparatus and said second secure computation apparatus; and generate fixed point number with extended digits by repeating, toward a higher-order digit, computation of data distribution values of a high-order digit by generating the data with extended digits, distribution of the data distribution values of the high-order digit by distributing the data with extended digits, generation of carry distribution values of the high-order digit by generating carry with extended digits, and distribution of the carry distribution values of the high-order digit by distributing the carry with extended digits, adds a computed first data distribution value of the extended digit number to the high-order position of the first data distribution value of the fixed-point number to make a first extended data distribution value of the extended fixed-point number, genarateing a first extended carry value of the extended fixed-point number as a generated extended carry distribution value of the extended most significant digit, adding a computed second data distribution value of the extended digit number to the high-order position of the second data distribution value of the fixed-point number to make a second extended data distribution value of the extended fixed-point number, and generating a second extended carry distribution value of the extended fixed-point number as a generated extended carry distribution value of the extended most significant digit, and wherein said secure digit extender generates the first extended data distribution value, the second extended data distribution value, the first extended carry distribution value, and the second extended carry distribution value for each of the first fixed-point number and the second fixed-point number.

15. The secure computation system according to claim 14, wherein said secure multiplier is configured to:

distribute random numbers by distributing two random numbers of a same number of digits as digits of an extended fixed-point number and a product of the two random numbers to said first secure computation apparatus and said second secure computation apparatus using the additive secret sharing scheme;

perform multiplication with extended digits by executing, by said first secure computation apparatus and said second secure computation apparatus in cooperation with each other, secure multiplication using the extended data distribution values of the first extended fixed-point number and the second extended fixed-point number, the two random numbers, and distribution random numbers of the two random number and the product of the two random numbers while performing data exchange with protecting security between the at least two secure computation apparatuses, to compute extended data distribution values of the extended multiplication result; and adjust digits by adjusting digits of the extended data distribution values of the extended multiplication result to generate data distribution values of the secure multiplication result.

16. The secure computation system according to claim 4, wherein said secure multiplier is configured to:

distribute random numbers by distributing two random numbers of a same number of digits as digits of an extended fixed-point number and a product of the two random numbers to said first secure computation apparatus and said second secure computation apparatus using the additive secret sharing scheme;

perform multiplication with extended digits by executing, by said first secure computation apparatus and said second secure computation apparatus in cooperation with each other, secure multiplication using the extended data distribution values of the first extended fixed-point number and the second extended fixed-point number, the two random numbers, and distribution random numbers of the two random number and the product of the two random numbers while performing data exchange with protecting security between the at least two secure computation apparatuses, to compute extended data distribution values of the extended multiplication result; and adjust digits by adjusting digits of the extended data distribution values of the extended multiplication result to generates data distribution values of the secure multiplication result.

17. A secure computation method for a secure computation system, comprising:

generating data distribution values, sign distribution values, and carry distribution values from at least two fixed-point numbers by distributing each of the at least two fixed-point number using an additive secret sharing scheme;

generating at least two extended fixed-point numbers formed from extended data distribution values, extended sign distribution values and extended carry distribution values, all of which are obtained by extending digit numbers using the data distribution values, the sign distribution values and the carry distribution values of each fixed-point number while performing data exchange with protecting security between at least two secure computation apparatuses; and calculating distribution values of a secure multiplication result by generating extended data distribution values, extended sign distribution values and extended carry distribution values of an extended multiplication result of multiplying a first extended fixed-point number and a second extended fixed-point number that are generated in the extending digit numbers while performing data exchange with protecting security between the at least two secure computation apparatuses, and adjusting the digit numbers of the extended data distribution values of the extended multiplication result.

18. A non-transitory computer-readable storage medium storing a secure computation program for causing a computer to execute a method, comprising:

distributing data values of at least two fixed-point numbers using an additive secret sharing scheme for secure multiplication;

distributing sign values of the at least two fixed-point numbers using the additive secret sharing scheme for the secure multiplication; and distributing, using the additive secret sharing scheme for the secure multiplication, carry values occurring when distributing the data values of the at least two fixed-point numbers using the additive secret sharing scheme.

19. The secure computation program according to claim 18, wherein the additive secret sharing scheme is an additive (2, 2) scheme usable by a secure computation method.

20. The secure computation program according to claim 18, the method further comprising:

generating at least two extended fixed-point numbers formed from extended data distribution values, extended sign distribution values, and extended carry distribution values, all of which are obtained by extending digit numbers using the data distribution values, the sign distribution values and the carry distribution values of the at least two fixed-point numbers and with referring, while performing data exchange with protecting security with at least one secure computation apparatus, extended data distribution values and extended carry distribution values generated from counterpart of distribution values the at least two fixed-point number; and calculating distribution values of a secure multiplication result by generating extended data distribution values, extended sign distribution values and extended carry distribution values of an extended multiplication result of multiplying a first extended fixed-point number and a second extended fixed-point number with referring, while performing data exchange with protecting security with the at least one secure computation apparatus, extended data distribution values and extended carry distribution values generated from counterpart of distribution values of at least two extended fixed-point numbers, and adjusting the digit numbers of the extended data distribution values of the extended multiplication result.

* * * * *